July 18, 1944.   M. M. RAYMER   2,354,087
DUAL TYPE VOLUME FILLER
Filed March 6, 1940   21 Sheets-Sheet 1

Inventor
MORRIS M. RAYMER,
BY Toulmin & Toulmin
ATTORNEYS.

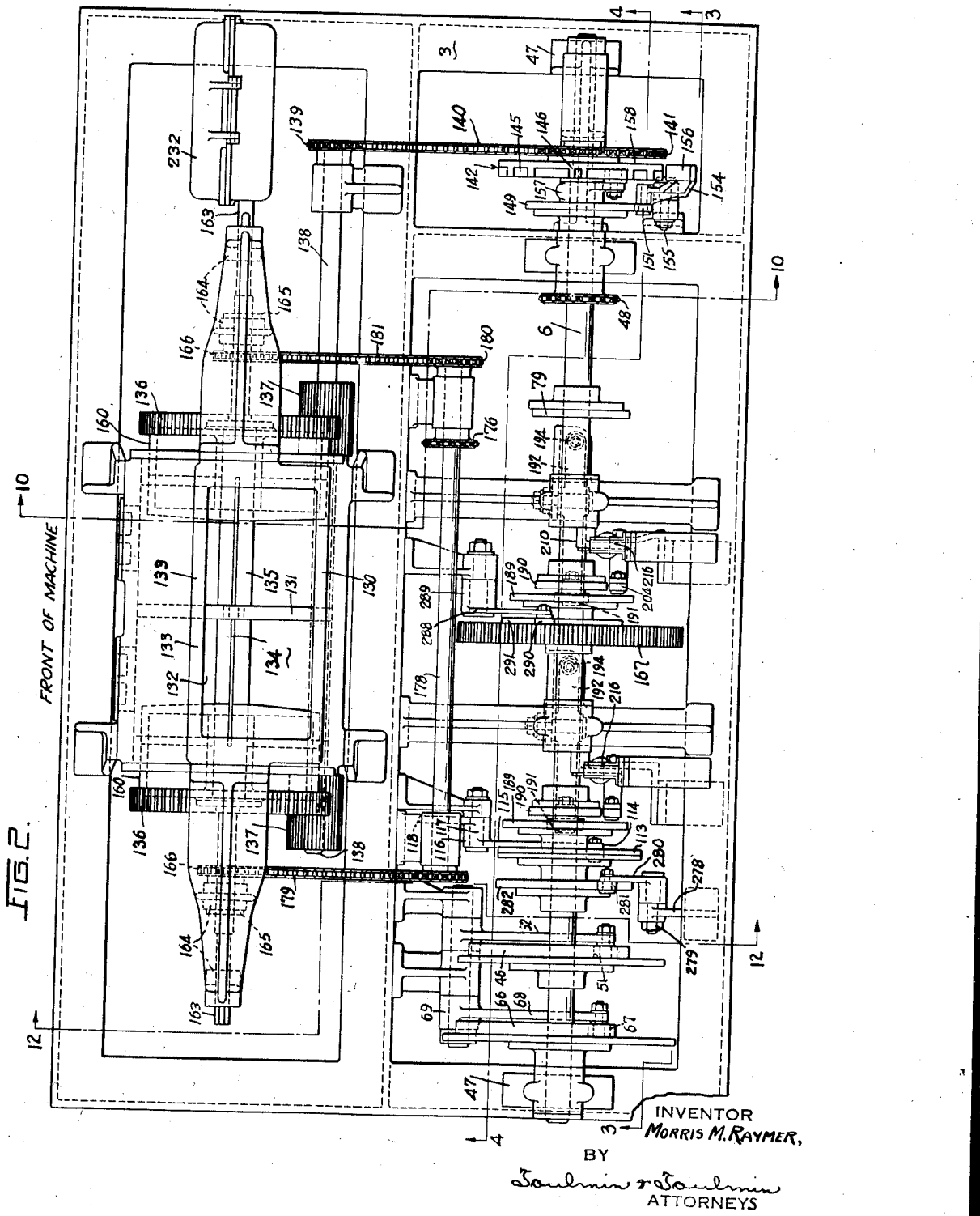

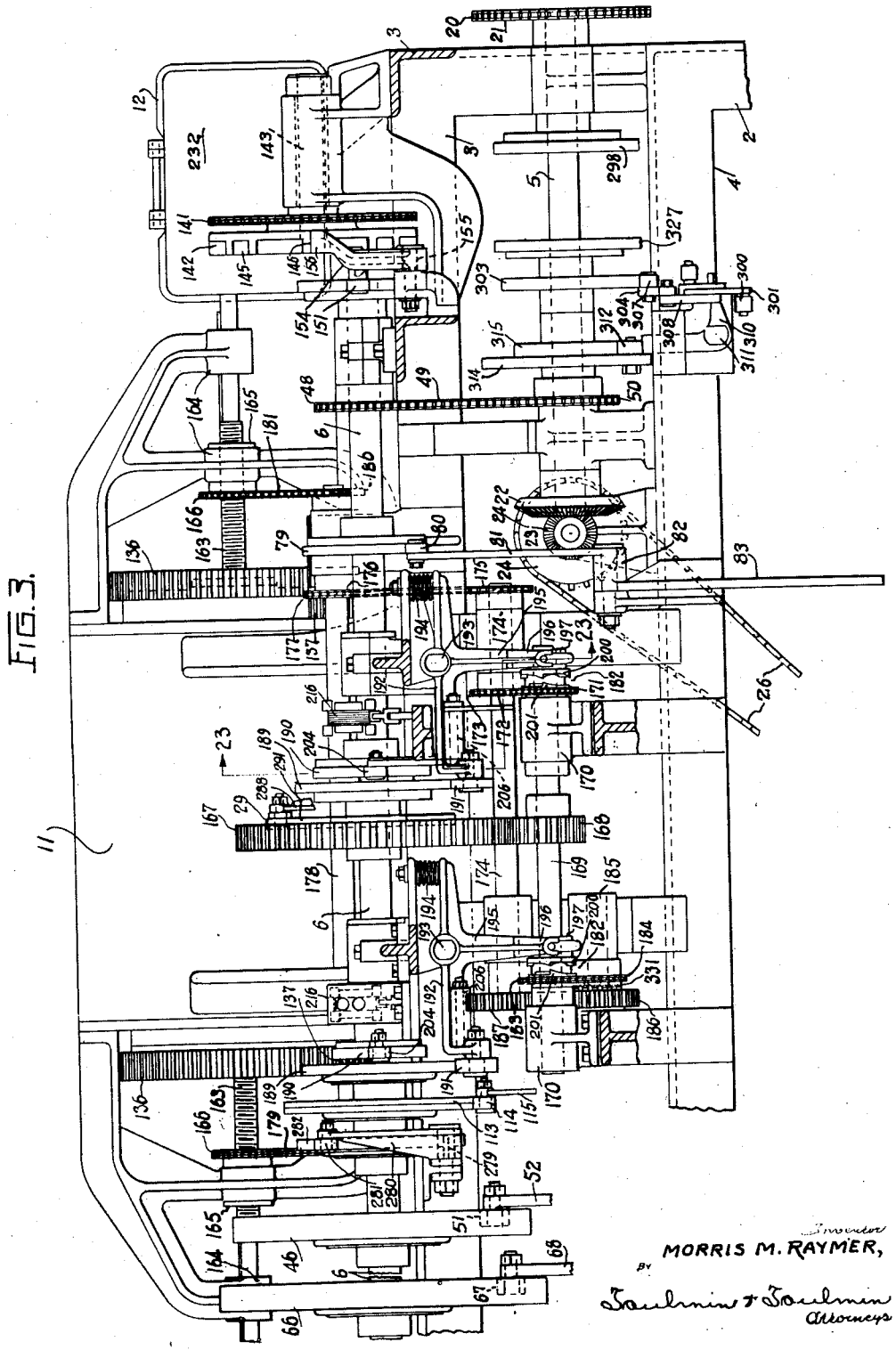

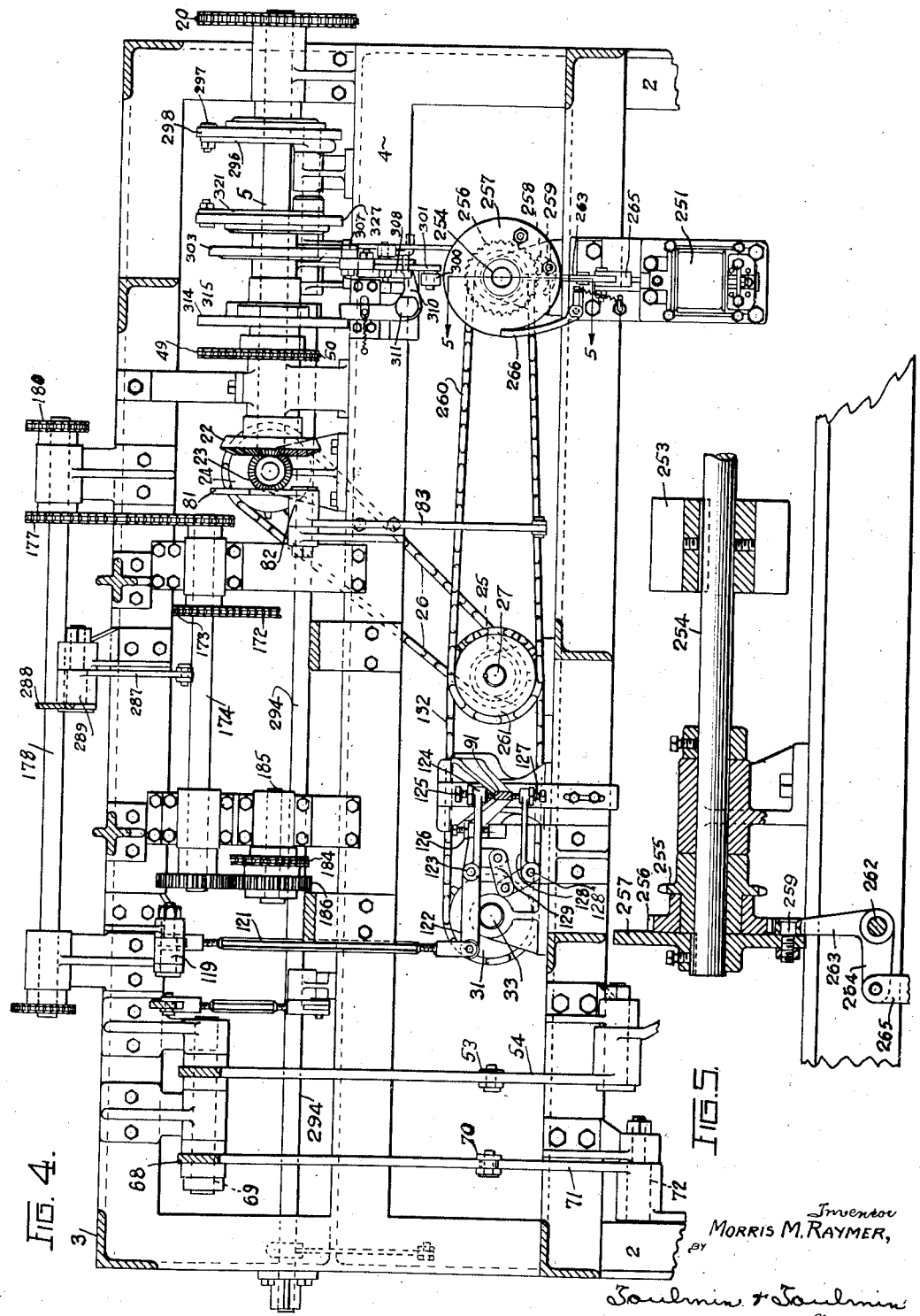

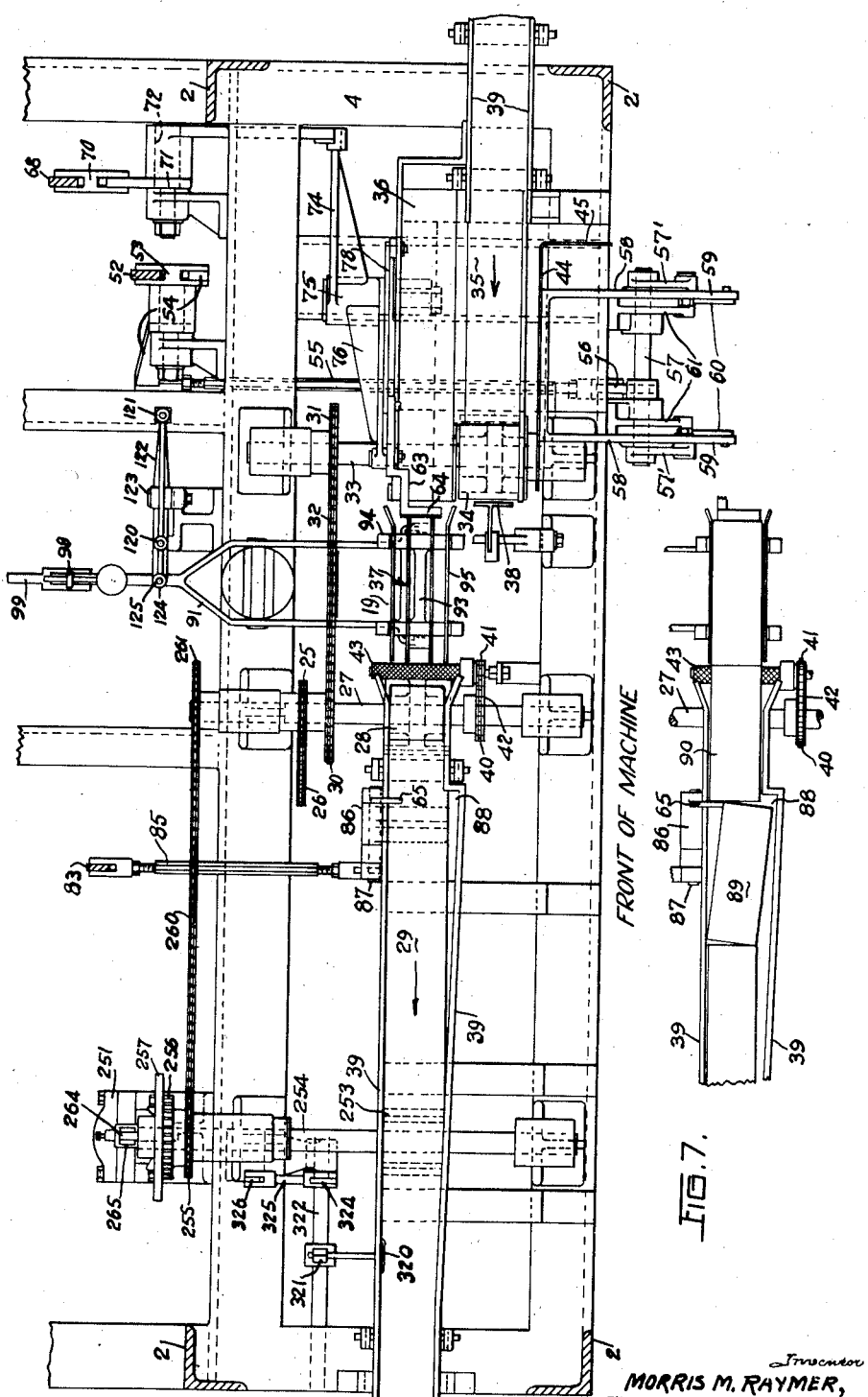

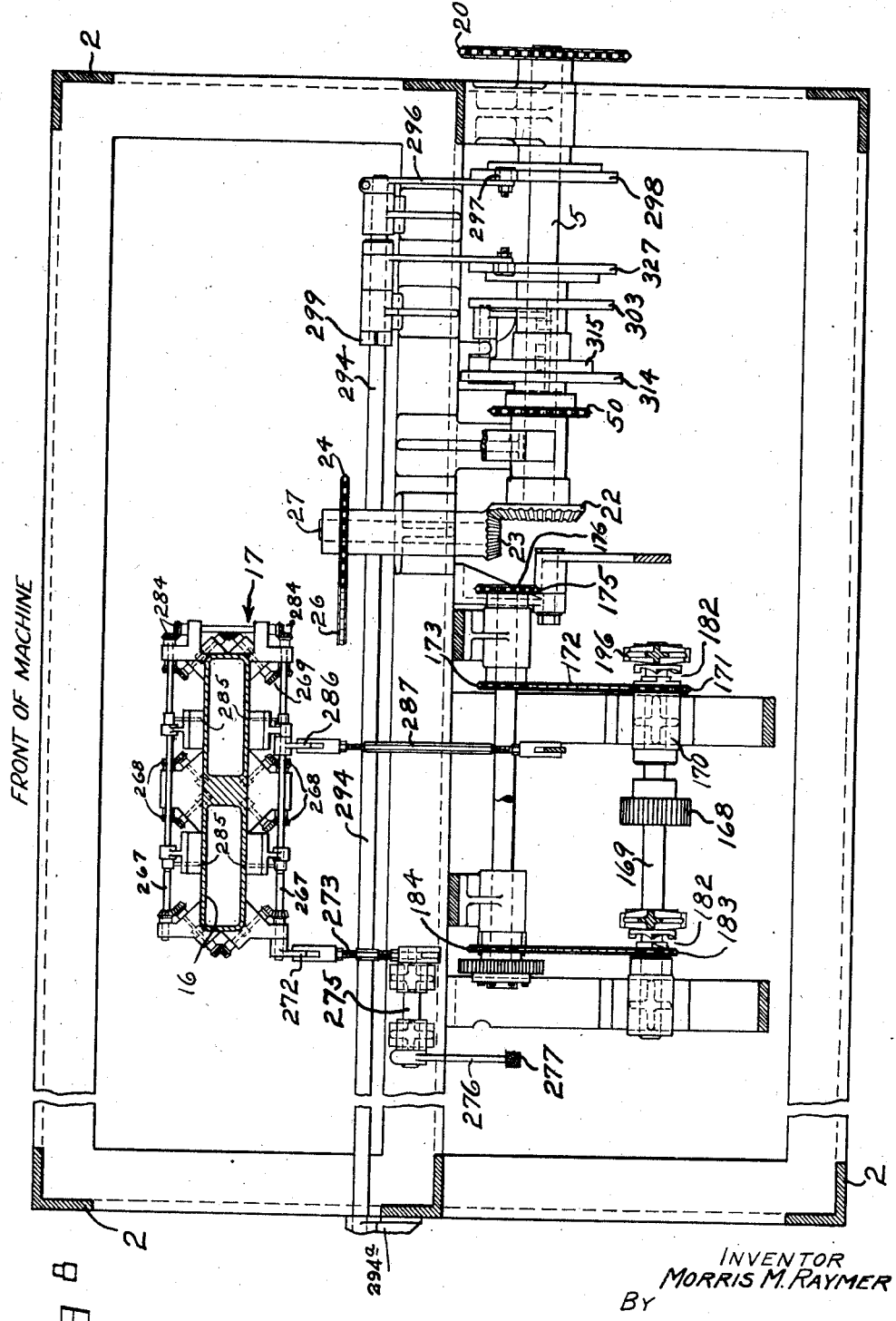

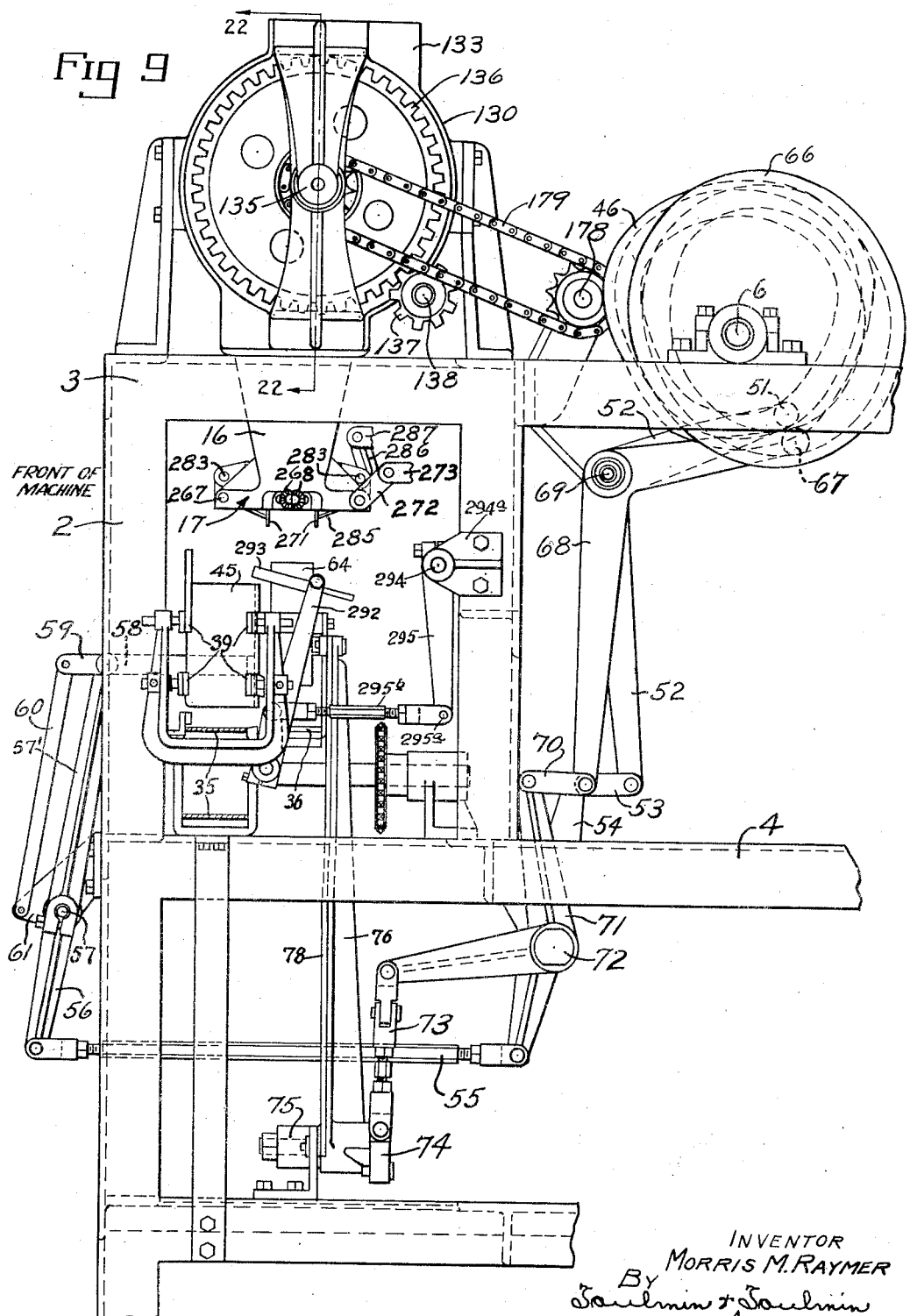

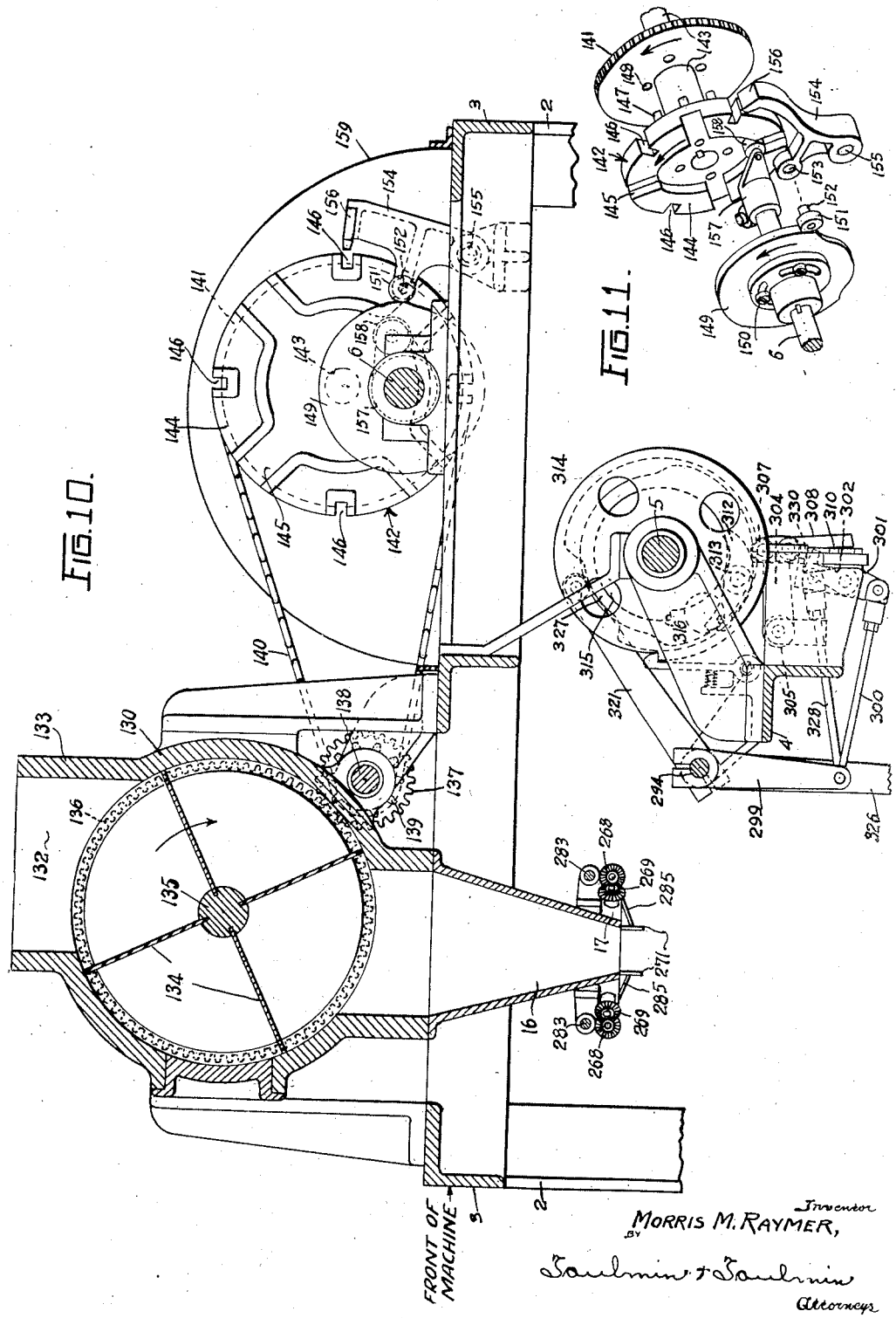

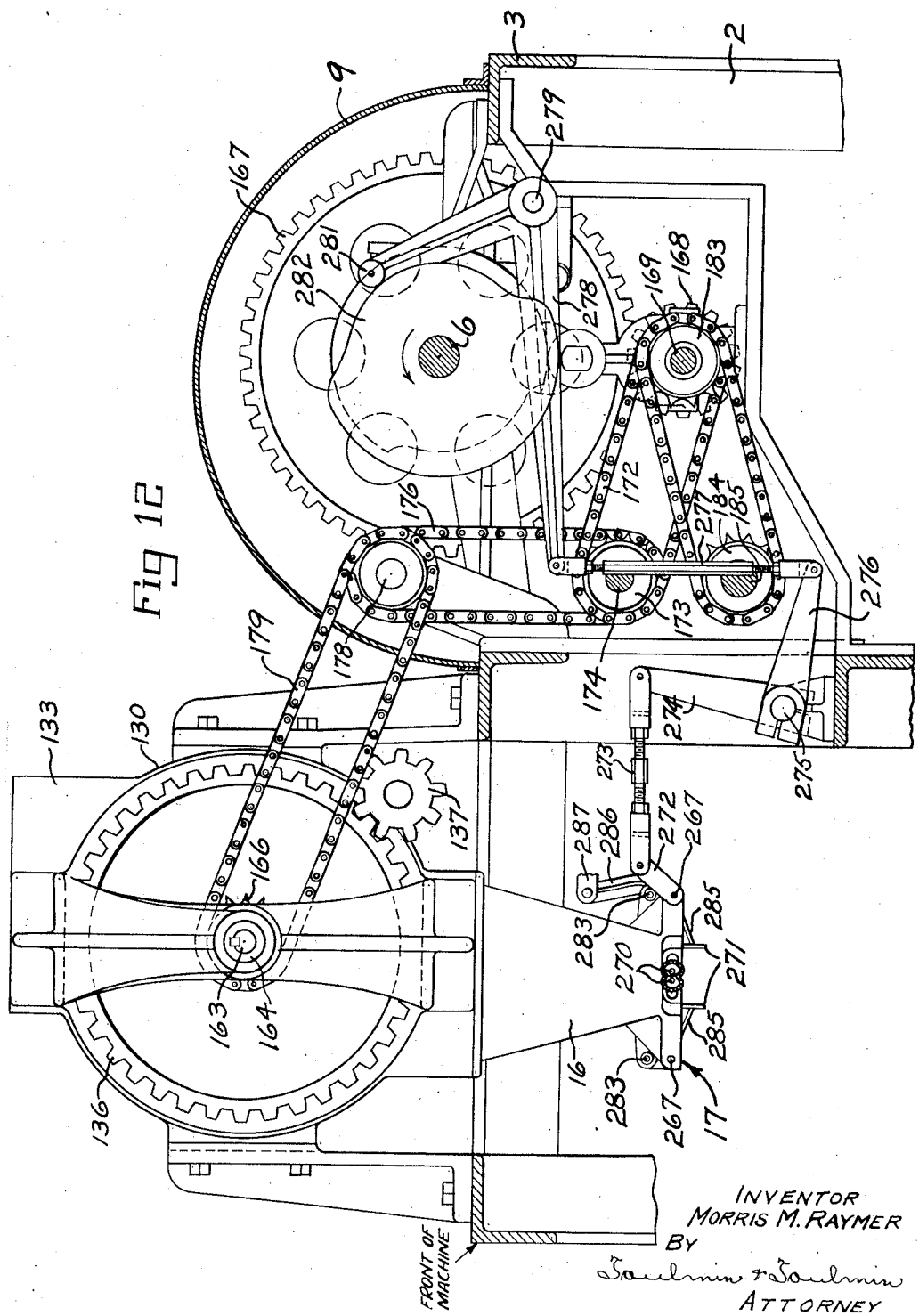

July 18, 1944.  M. M. RAYMER  2,354,087
DUAL TYPE VOLUME FILLER
Filed March 6, 1940  21 Sheets-Sheet 10

INVENTOR.
MORRIS M. RAYMER,
BY
Toulmin & Toulmin
ATTORNEYS.

July 18, 1944.   M. M. RAYMER   2,354,087
DUAL TYPE VOLUME FILLER
Filed March 6, 1940   21 Sheets-Sheet 11

Inventor
MORRIS M. RAYMER,
By Toulmin & Toulmin
Attorneys

July 18, 1944.  M. M. RAYMER  2,354,087
DUAL TYPE VOLUME FILLER
Filed March 6, 1940  21 Sheets-Sheet 12

FIG.18.

FRONT OF MACHINE

Morris M. Raymer, Inventor
By Toulmin & Toulmin, Attorneys

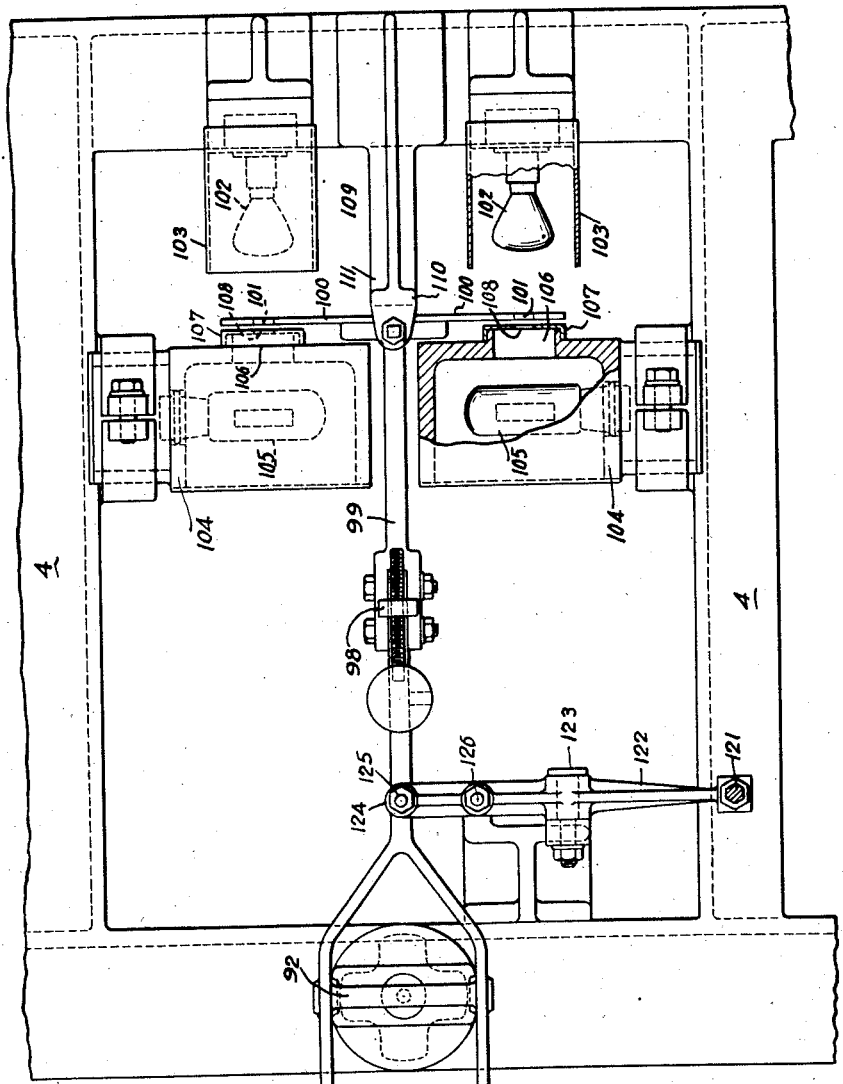
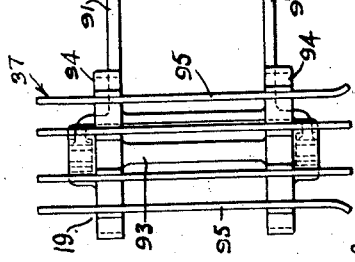

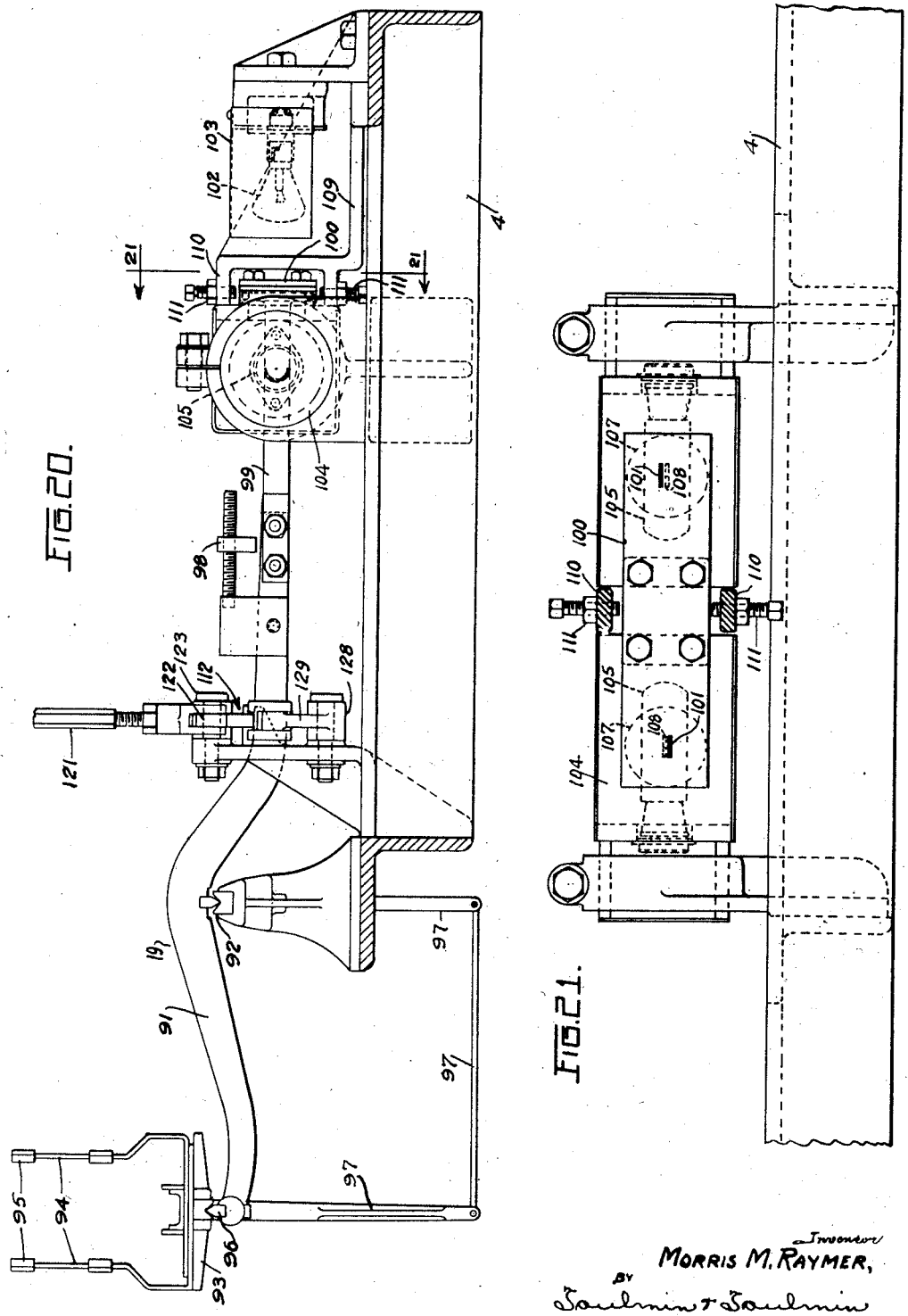

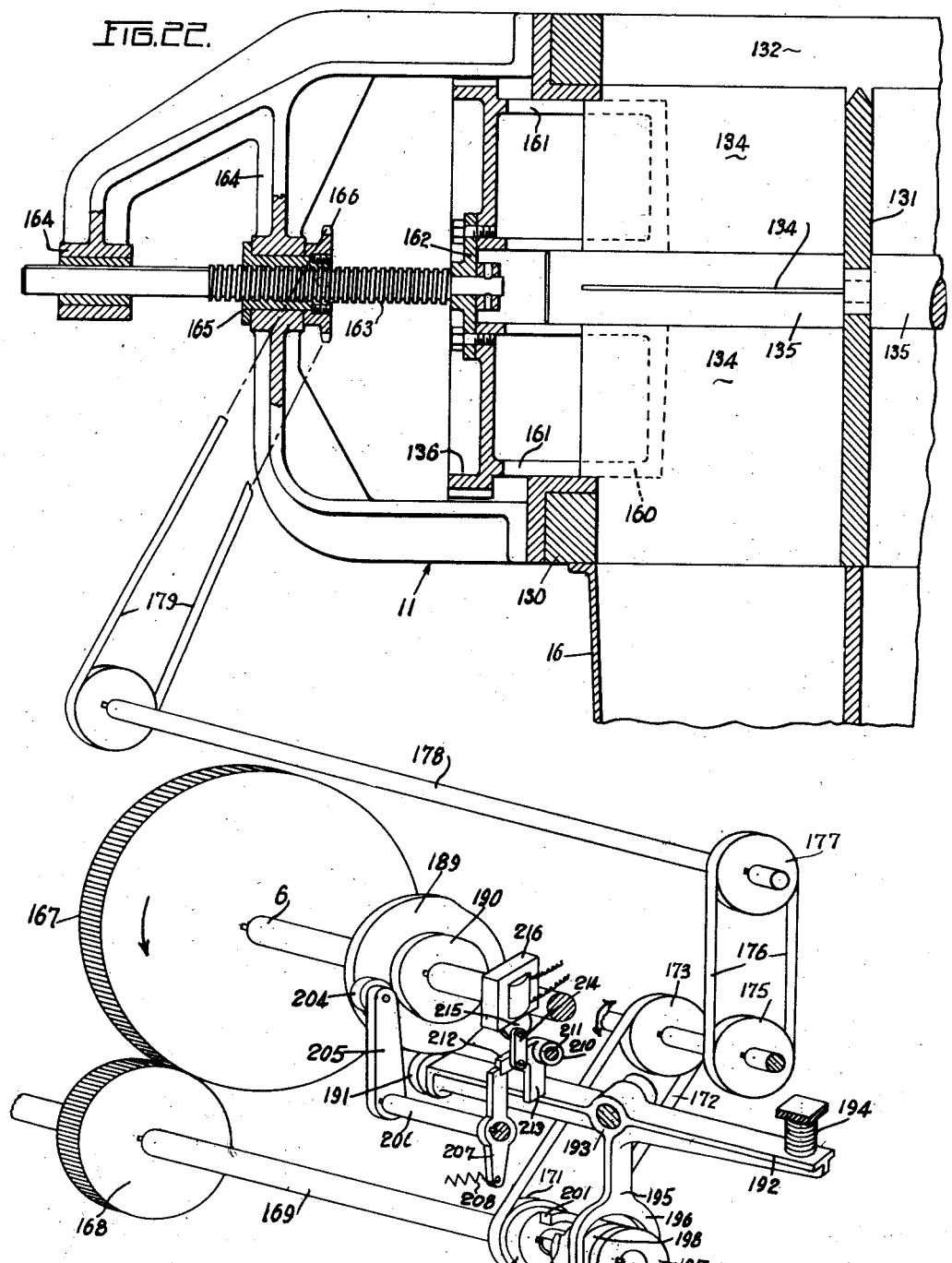

July 18, 1944. M. M. RAYMER 2,354,087
DUAL TYPE VOLUME FILLER
Filed March 6, 1940 21 Sheets-Sheet 16
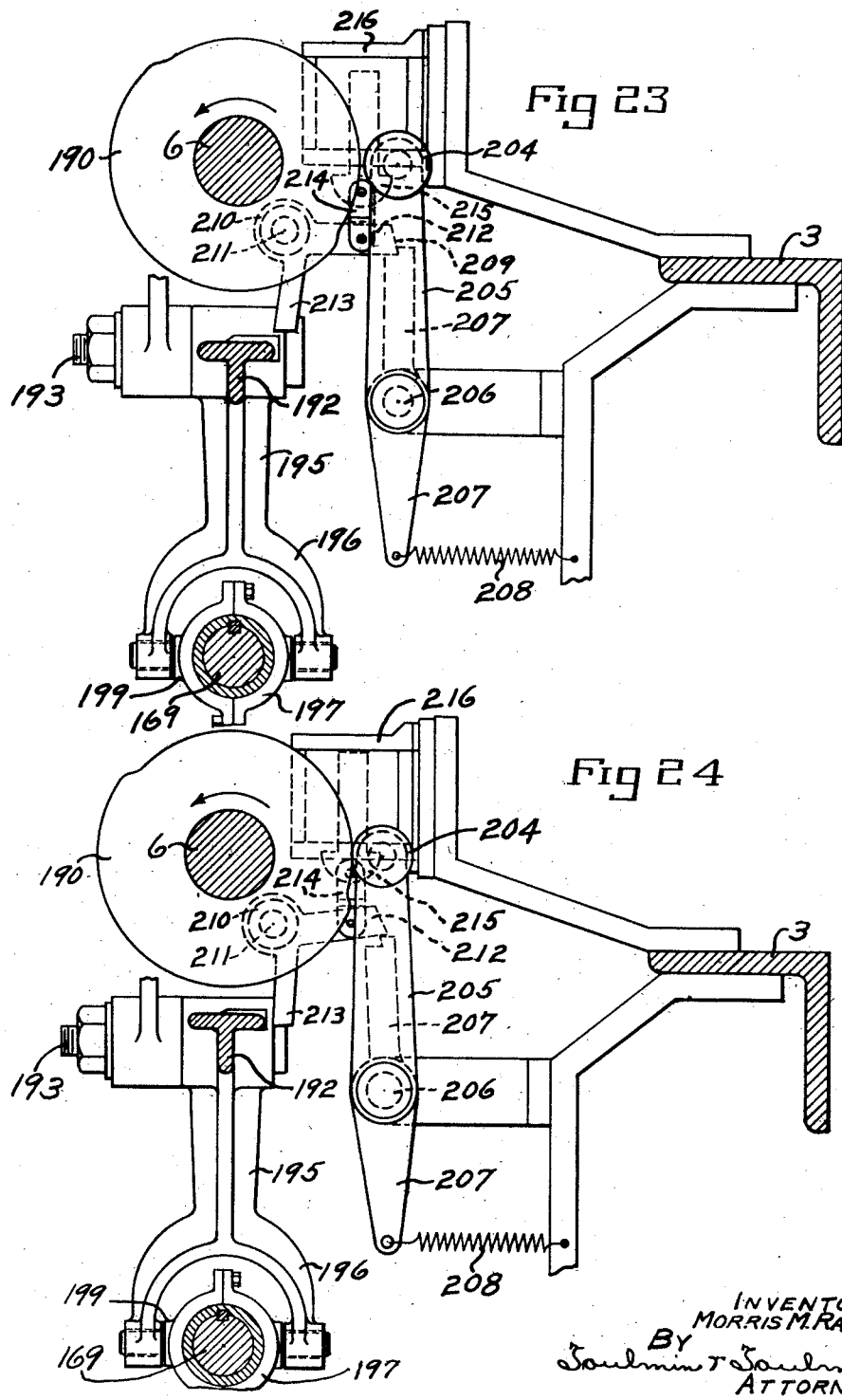
INVENTOR
MORRIS M. RAYMER
BY
Toulmin T Toulmin
ATTORNEY

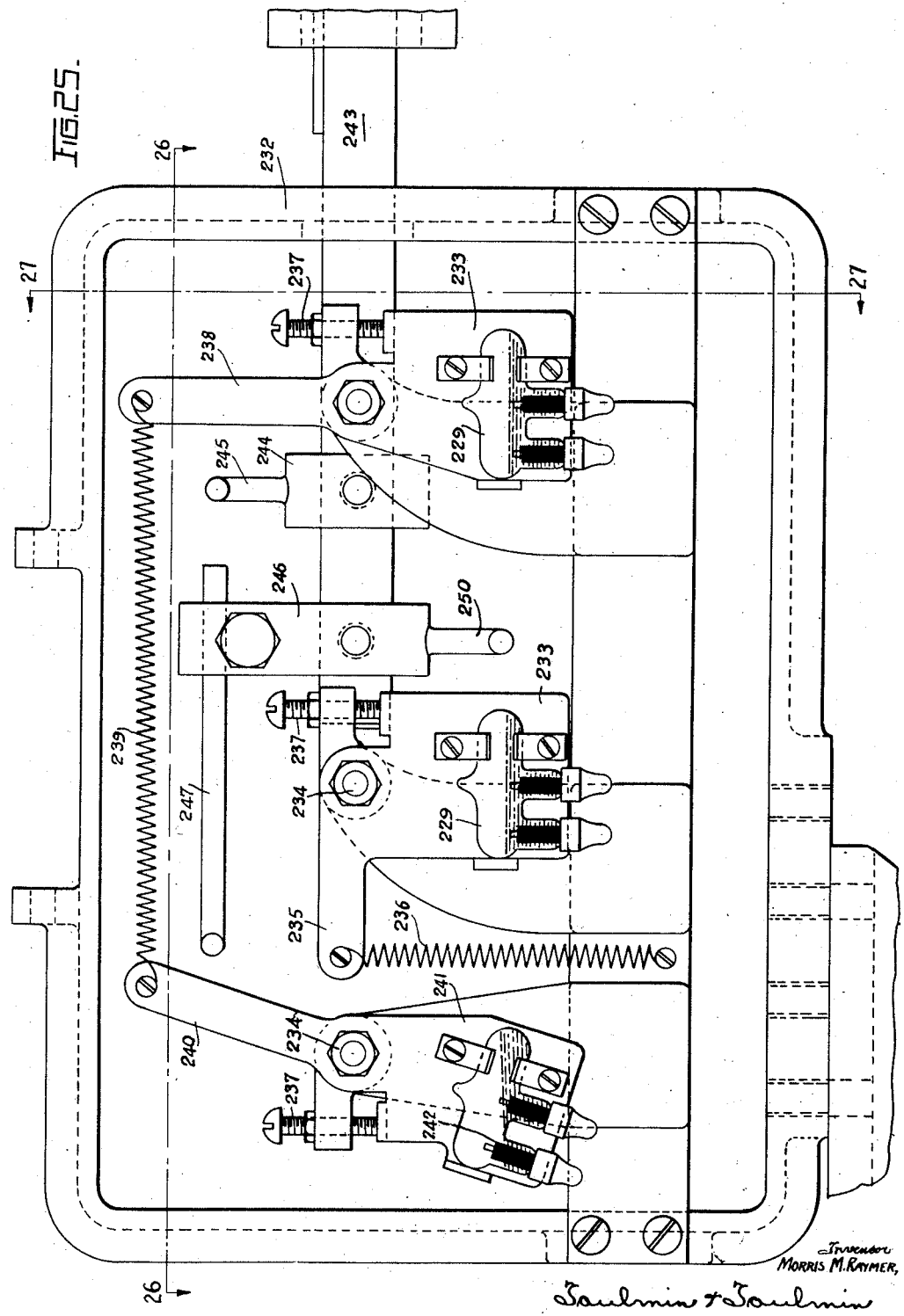

July 18, 1944.　　　　M. M. RAYMER　　　　2,354,087
DUAL TYPE VOLUME FILLER
Filed March 6, 1940　　　21 Sheets-Sheet 18
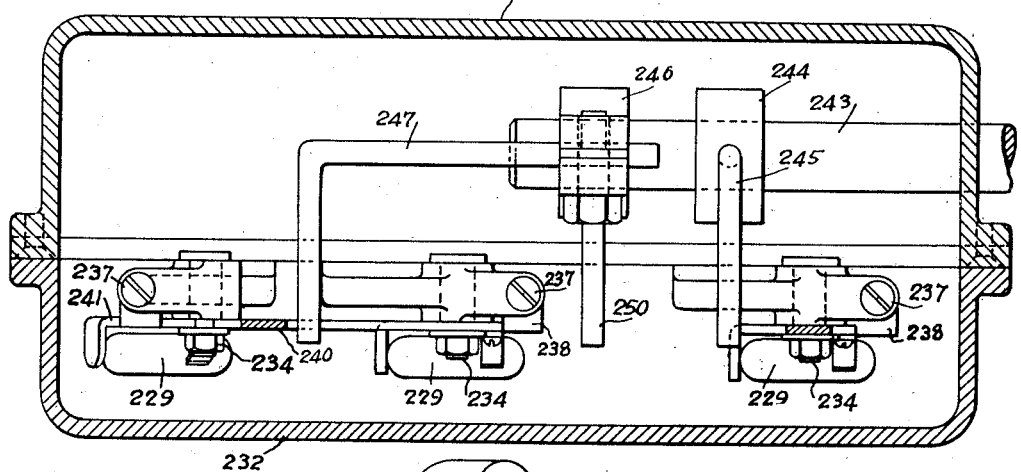
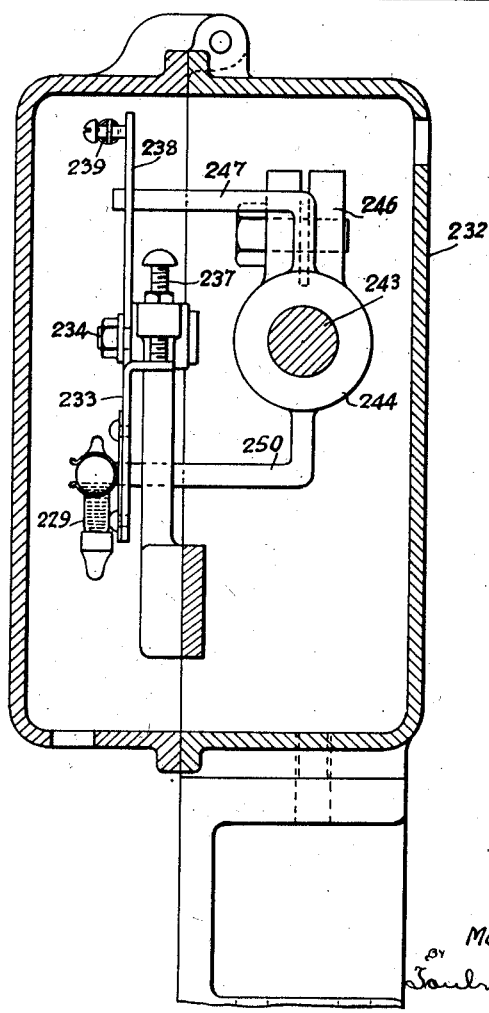
Inventor
MORRIS M. RAYMER,
By
Toulmin & Toulmin
Attorneys

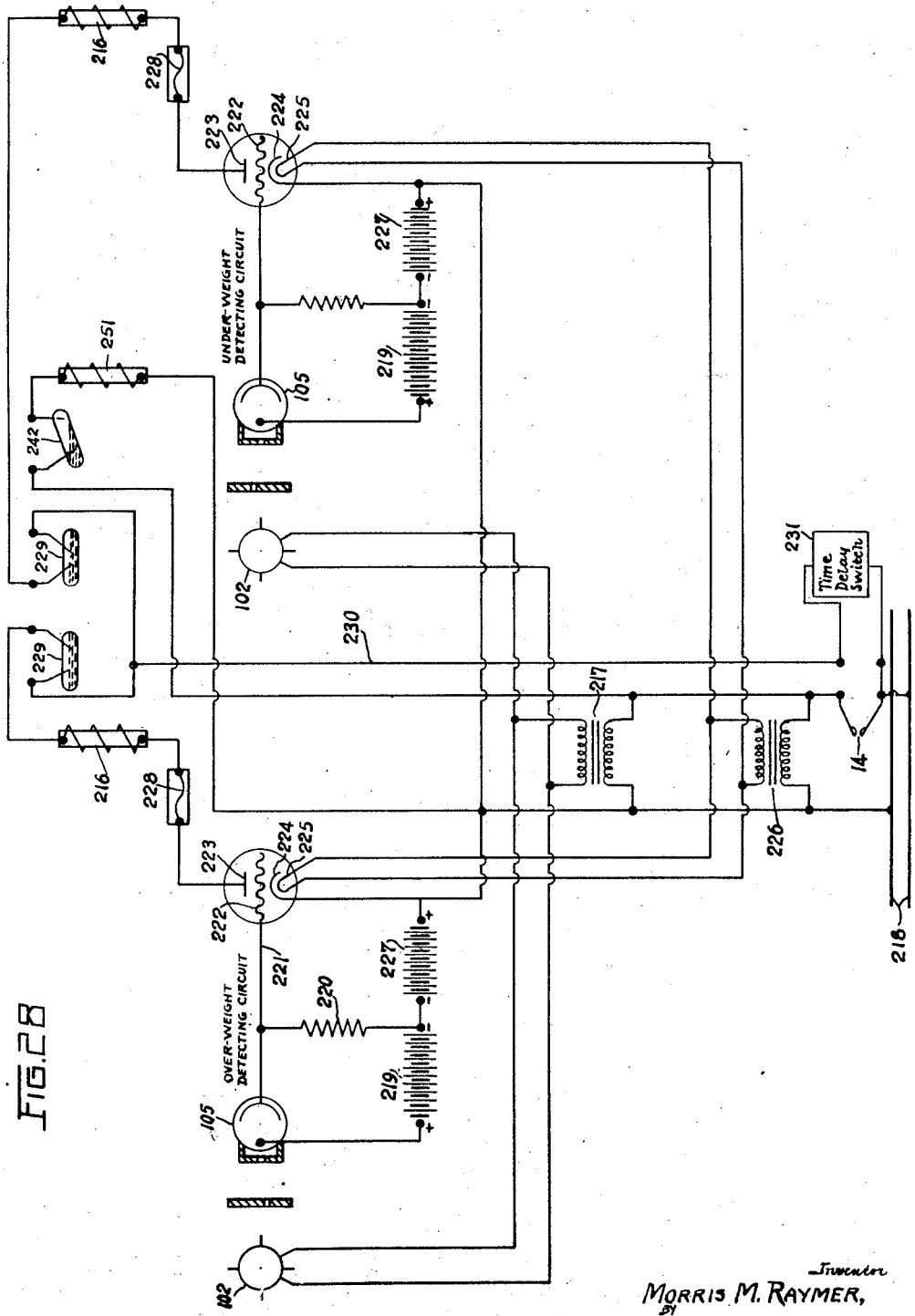

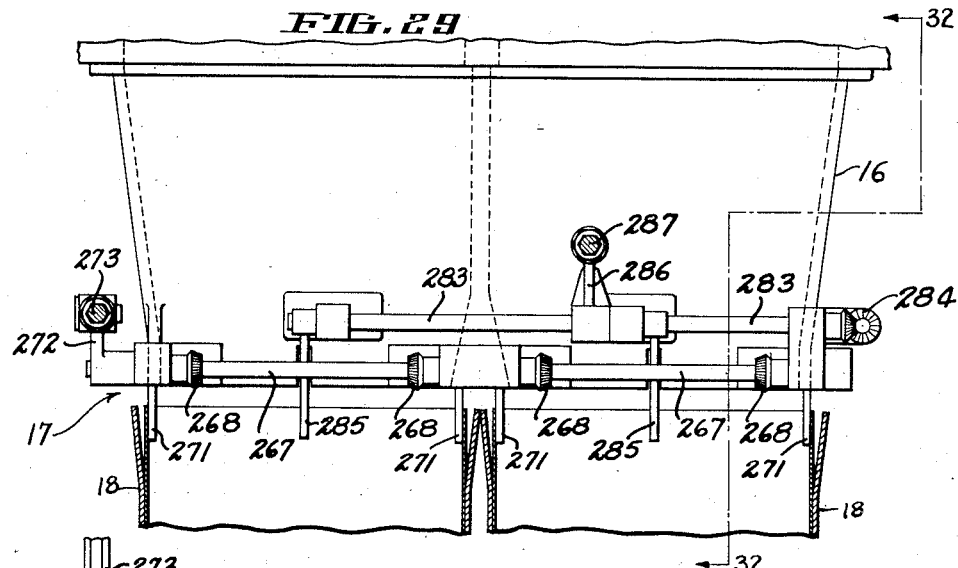
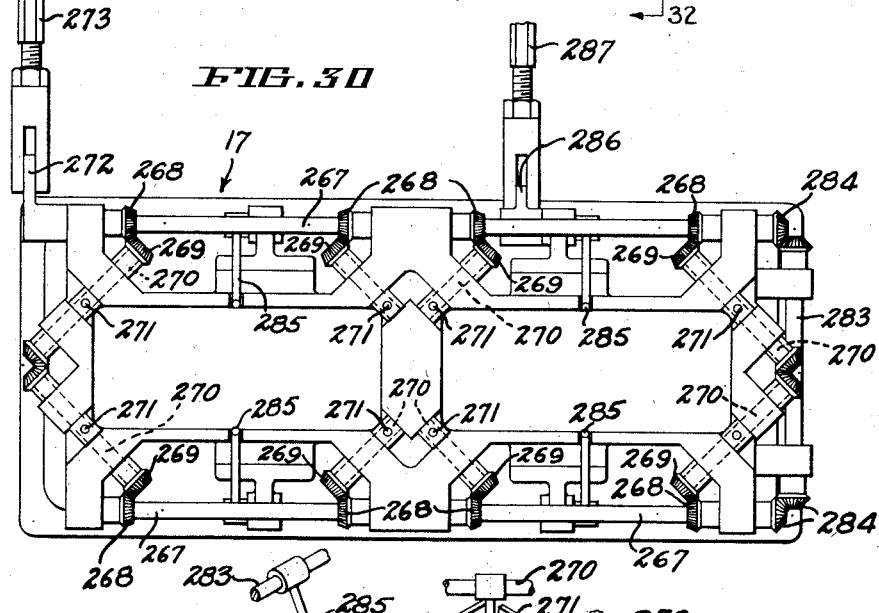
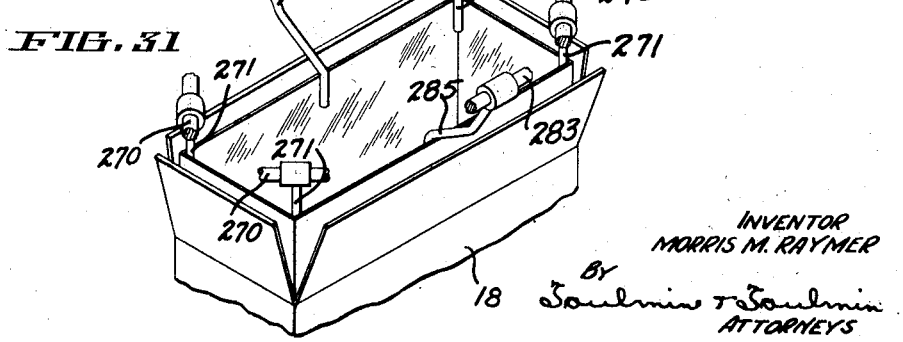

July 18, 1944.　　　　M. M. RAYMER　　　　2,354,087
DUAL TYPE VOLUME FILLER
Filed March 6, 1940　　　21 Sheets-Sheet 21
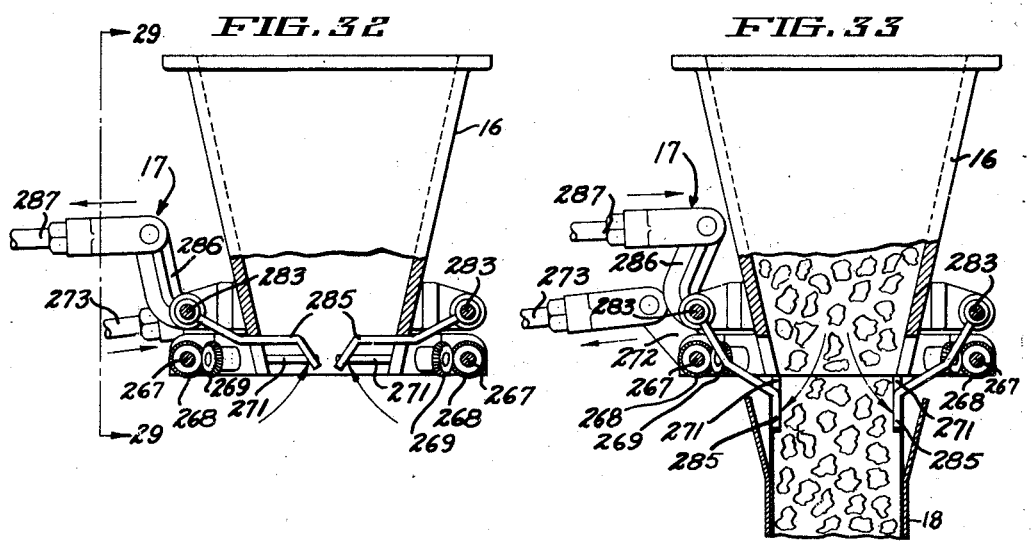
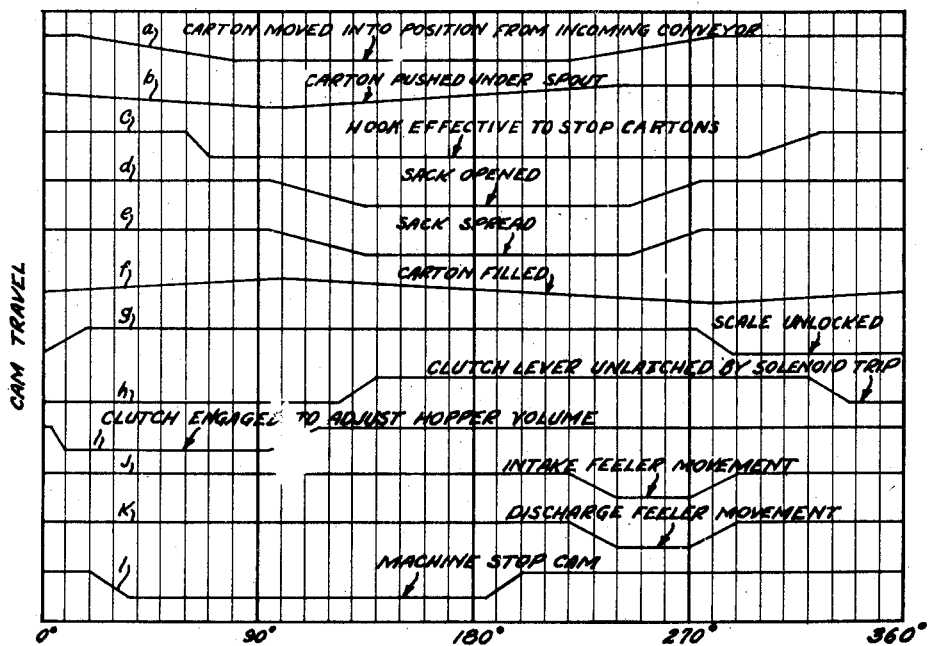
INVENTOR
MORRIS M. RAYMER
BY
Toulmin & Toulmin
ATTORNEYS Patented July 18, 1944

2,354,087

UNITED STATES PATENT OFFICE 2,354,087

DUAL TYPE VOLUME FILLER

Morris M. Raymer, Augusta, Mich., assignor to Kellogg Company, Battle Creek, Mich., a corporation of Delaware Application March 6, 1940, Serial No. 322,632

10 Claims. (Cl. 249—2)

The present invention relates to machines for filling containers with a fluent material, such as cereal, sugar, salt, etc. In particular, the improved machine serves to fill a liner or sack contained in a carton with toasted corn flakes.

There is provision made on the machine for accurately weighing the charges of fluent material, thus to be certain that the contents of each carton are of a predetermined standard weight. In the usual type of check weigher employed in connection with carton-filling machines, it has been customary to employ a scale beam, counterweighted to a given weight standard, and upon movement of the beam, which happens when the filled carton resting on the beam is either of greater or less weight than the predetermined standard, the beam is caused to make or break an electrical circuit which forms part of a system for increasing or decreasing the size of each charge of fluent material, depending on whether the scale indicates under-weight or over-weight. The scale beam, under these circumstances, carries contacts or other structures for making and breaking the circuit and it is apparent that this structure constitutes a dead load or drag on the scale beam. While check weighers of this character are satisfactory, it has been found that after continuous operation the measured load may differ, at least slightly from the predetermined weight, due mainly to this drag on the scale beam, since this weight tends to render the operation of the beam somewhat sluggish.

One of the main objects of the present invention is to provide an improved mechanism by which the movements of the scale beam are translated into movements of the measuring hopper in order to give a greater degree of accuracy of measurement, and therefore closer agreement between the contents of a carton resting on the scale beam and the particular determined standard. In brief, this object is attained by the use of a phototube light system which is so correlated with the scale beam and entails absolutely no weight or drag on the beam, as accurately to signal the measuring hopper and cause the necessary adjustments in case the beam is moved from its neutral or balanced position, due to the under-weight or over-weight of the carton on the beam.

The measuring hopper of a typical prior machine has a movable wall for adjustment of its volume, and limit switches are provided to prevent excessive movement of this wall during either an increase or decrease of volume of the hopper, as signalled for by the scale beam. These switches were usually of the ordinary spring or flexible type and necessitated careful adjustment in order to set the limits of movement of the hopper wall to a precise maximum amount.

In accordance with still another feature of the present invention, the spring switches have been replaced by rotatable mercury switches, and mechanism is provided for rotating the switches when the movement of the hopper wall exceeds a given amount in either direction. Thus the improved machine provides an added degree of dependability of operation.

Other features than those discussed hereinbefore are contained in the improved machine, and the general object of the invention is to provide a carton-filling machine of the check weigher type which will be of simpler design than prior machines and with a consequent greater degree of dependability of operation, and in addition a check weigher mechanism which causes the volume of the measuring hopper to conform more closely to standard quantities and weight. The invention will be better understood when reference is made to the following description and the accompanying drawings.

In the drawings:

Figure 2 is a plan view of the machine.

Figure 3 is a partial rear view, taken on the line 3—3 of Figure 2, showing the cam shafts and other parts of the machine control mechanism.

Figure 4 is a partial intermediate rear view of the machine taken approximately along the line 4—4 of Figure 2.

Figure 5 is a detail sectional view taken on the line 5—5 of Figure 4.

Figure 6 is a partial sectional plan view taken on the line 6—6 of Figure 1.

Figure 7 is a fragmentary plan view of the outgoing line of cartons, showing the operation of the stop nook.

Figure 8 is a sectional plan view on the line 8—8 of Figure 1.

Figure 9 is a partial right-end elevation, indicated by the line 9—9 on Figure 1.

Figure 10 is a vertical sectional view of the upper part of the machine, taken on the line 10—10 of Figure 2.

Figure 11 is a somewhat simplified perspective of a portion of the mechanism shown in Figure 10.

Figure 12 is a vertical sectional view of the upper part of the machine, taken on the line 12—12 of Figure 2.

Figure 18 is a vertical sectional view taken approximately on the line 18—18 of Figure 1.

Figure 19 is an enlarged plan view, partly broken away, of the scale and photo-electric unit seen in side elevation in Figures 13 and 20.

Figure 20 is a side elevation of the scale and photo-electric unit of Figure 19.

Figure 21 is a sectional view taken on the line 21—21 of Figure 20, showing apertures for passage of light, provided in the plate on the end of the scale beam.

Figure 22 is a vertical section on the line 22—22 of Figure 9 through one-half of the feeder head, showing in association therewith and in diagrammatic perspective, the mechanism for adjusting the volumetric capacity of the feeder.

Figure 23 is a detail section on the line 23—23 of Figure 3, showing a portion of the volume-adjusting mechanism in one position of its operation.

Figure 24 is a view similar to Figure 23, but showing the mechanism in another position.

Figure 25 is a front view of the electrical control means for limiting the volumetric adjustment of the feeder. In this view the cover of the control box has been removed.

Figure 26 is a horizontal section taken on the line 26—26 of Figure 25.

Figure 27 is a vertical section taken on the line 27—27 of Figure 25.

Figure 28 is an electrical control diagram for checking the weight of the filled cartons and for actuating the volume-adjusting mechanism.

Figure 29 is an enlarged rear elevational view of the filling spout, indicated on the line 29—29 of Figure 32, showing the cartons in section and illustrating the sack-opening and sack-spreading fingers and their operating mechanism.

Figure 30 is a bottom plan view of the parts shown in Figure 29, omitting the cartons.

Figure 31 is a diagrammatic perspective view of a carton, showing the sack-opening and spreading fingers in operative position.

Figure 32 is an end view of the spout, partly in section as indicated on the line 32—32 of Figure 29, showing the sack-opening and spreading fingers in retracted position.

Figure 33 is a view similar to Figure 32, but with the fingers in their extended operative position, holding the inner sack of a carton open for the reception of fluent material.

Figure 34 is a comparative chart of the cams controlling the mechanical movements of the improved machine, for the purpose of illustrating a typical operating cycle.

Figure 1:
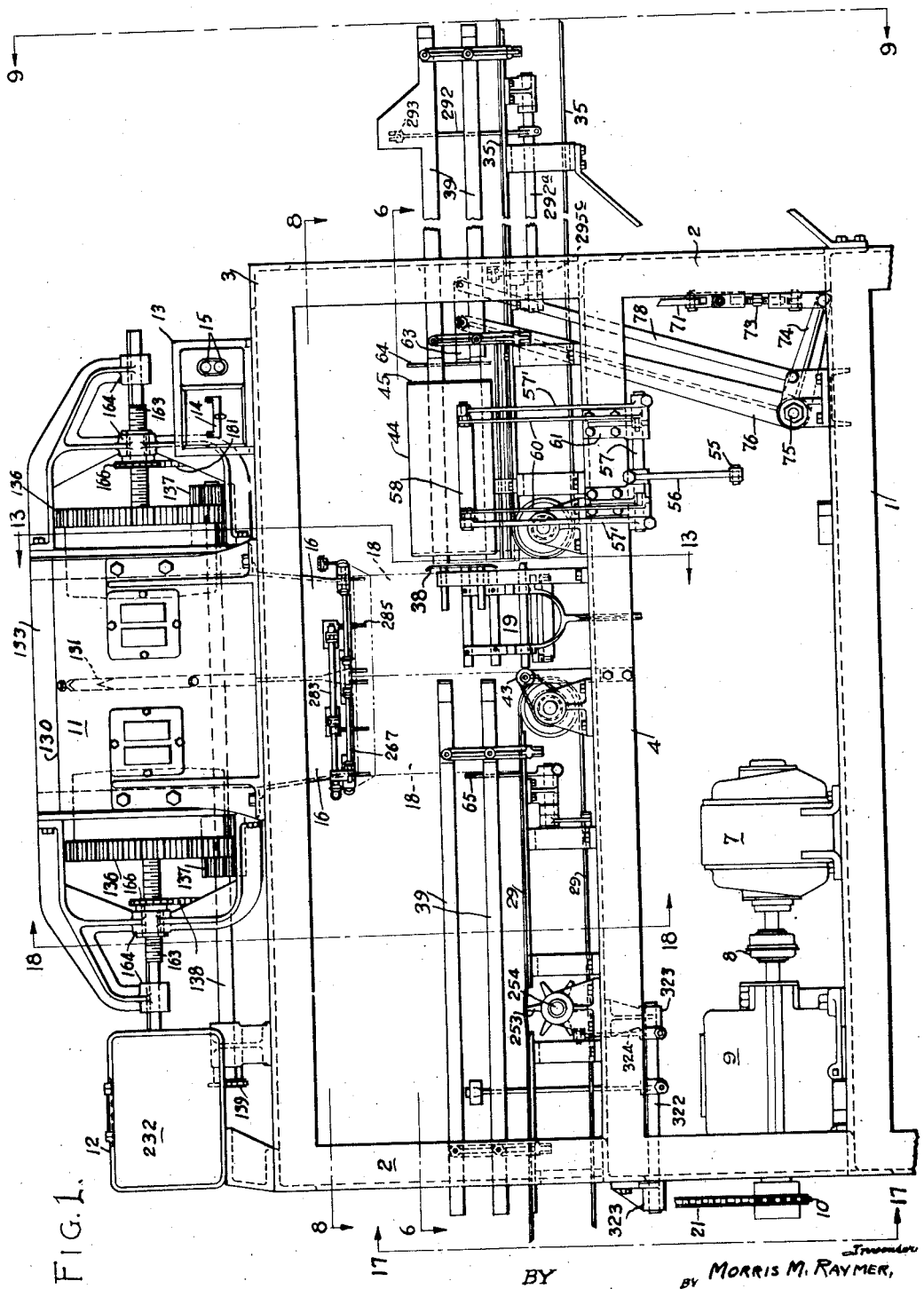
Figure 1 is a front elevation of the improved machine, but with the mechanism lying in the background omitted.

*General description of improved machine and its operation*

In general, the improved machine comprises mechanism for automatically moving a line of cartons into a position from which a pair of cartons is moved transversely as a unit from the line. This pair is then pushed, still as a unit, under a hopper having a pair of spouts from which a charge of fluent material is deposited into each carton. The cartons are maintained in this position during the filling operation by means of a stop hook which presses itself against the front surface of the double carton unit and prevents this unit from leaving the machine on the outgoing belt. This hook is automatically withdrawn upon completion of the filling operation. While the pair of cartons is in filling position one of the cartons rests on the weighing platform of a beam scale which is balanced by a counterweight to a predetermined standard.

The measuring hopper above the carton is provided with a movable wall at each end, and there is a connection through a system which includes a photoelectric cell arrangement for moving the end walls of the hopper either toward or away from one another, depending on the direction in which the scale beam is out of balance. While the carton pair is being filled, mechanical fingers positioned at the upper edge of each carton are moved downwardly so as to maintain the mouth of each carton in a fully opened position, thus insuring that none of the contents of the hopper will drop beyond the sides of each carton. The hopper is provided with a quadrantal vane structure or paddle wheel which is indexed through 90 degrees at a time in order to present the contents of each quadrantal compartment to the successive cartons. Thus the movement of the walls of the hopper serves simultaneously to change the volume of each quadrantal compartment, and the amount of fluent material dropped into each carton is thereby controlled. The arrangement is such that only the second of each pair of cartons rests on the scale pan, so that every other carton is subjected to the weighing operation. In order to prevent an excessive movement of the hopper walls, either inwardly or outwardly as called for by the weighing scale, mercury switches are secured to these walls and their function is to prevent any further movement of the hopper walls beyond a predetermined distance.

After the cartons have been filled with material they are moved out of filling position onto a conveyor belt, the restraining hook having been removed in the meantime. From that point on the cartons may be subjected to a jiggling operation in order to settle the contained material in case the height of the material were more than could be easily packaged by the carton. From the filling machine the carton is usually transported to a so-called top sealer, which folds the upper flaps of the carton and seals them.

There is a protective system provided by which certain parts of the machine are stopped if an emergency arises, particularly the mechanism which moves the cartons transversely, also the mechanism which pushes the cartons into filling position and the mechanism which controls the feeding hopper when abnormal conditions arise in any line of the carton travel. These conditions also comprise the failure of the empty carton supply, or the piling up of filled cartons in the outgoing line.

Having summed up the general operation of the machine, a detailed description will now be given, and in the interests of clearness the different operations and the structure by which they are accomplished will be described separately. The parts which will be described hereinafter are all carried on a frame provided with a number of supporting members at different levels for carrying the various cam shafts, gears, the conveying belt mechanism and the hopper and control switch.

Referring more particularly to Figures 1 to 4, 6, 8 and 9, the frame is constituted of a base member 1, made of angle iron, and of a generally rectangular configuration. Upstanding from the corners of the base there are uprights 2 which terminate in a rectangular top structure 3. At a position about midway between the base and top members there is a truss framework 4 which serves as a support for the conveyor belt mechanism, the weigher scale and the shaker. This truss framework also serves as a bearing support for a so-called auxiliary cam shaft 5, on which the so-called feeler cams are mounted and also the clutch cams for the automatic machine-stopping mechanism. The main cam shaft 6 (Figures 2 and 3) is carried by the uppermost frame members. This member 1 supports a motor 7 (Figure 1) which constitutes the sole driving force for the entire machine. The shaft of this motor is connected through a coupling 8 to a variable speed gear box 9, the power being taken off at a sprocket 10 which is journalled in one of the frame uprights, as seen in Figure 1.

The hopper mechanism is generally designated 11 and is carried on the top of the framework, as can be seen in Figure 1, and to the left of the hopper as indicated at 12 there is a switch box, the contents of which are shown in detail in Figures 25, 26 and 27. To the right of the hopper (Figure 1) and also resting on the uppermost frame member there is a switchboard 13, on which is mounted a manually operated two-pole switch 14 and start and stop buttons 15. The purpose of these switches will be pointed out hereinafter.

Figure 13:
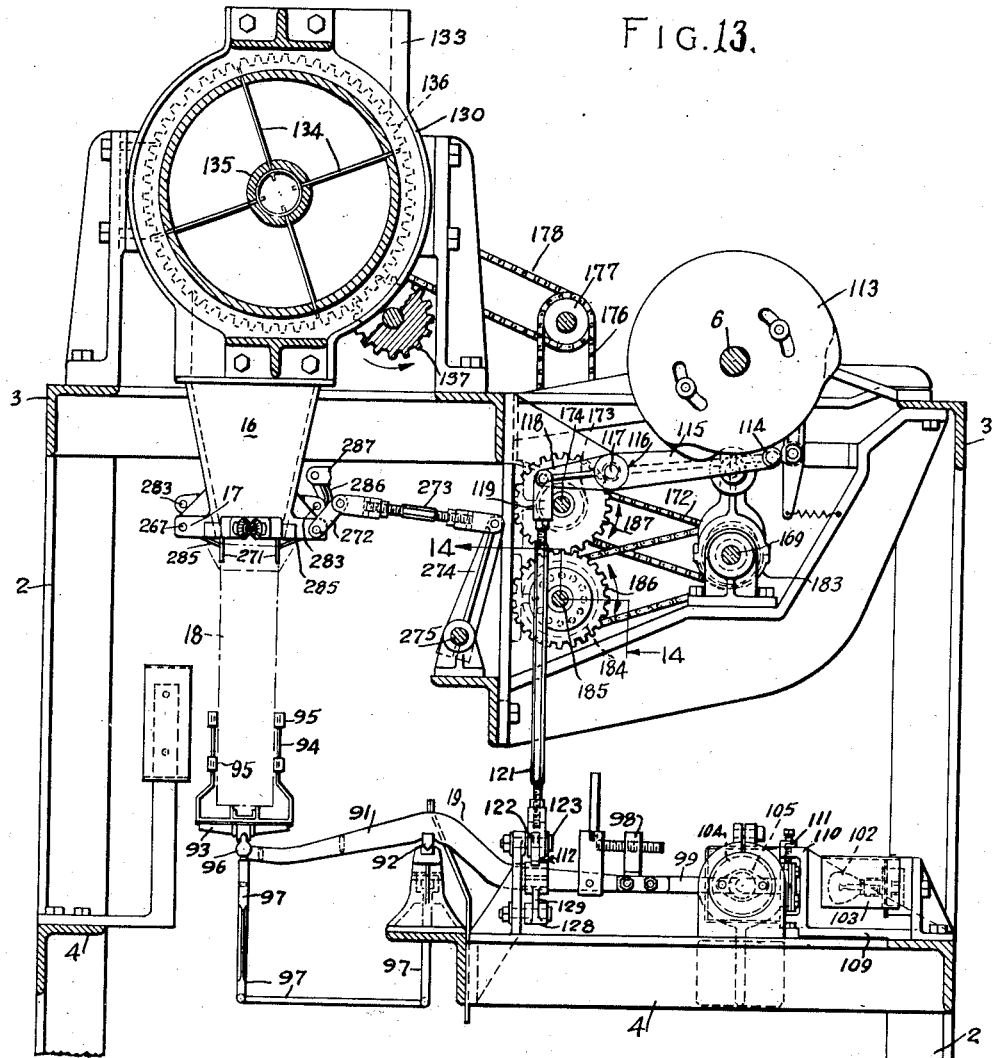
Figure 13 is a vertical sectional view taken on the line 13—13 of Figure 1.

Directly under the hopper 11 there is a pair of spouts 16 which terminate in a mechanism generally designated 17 for actuating fingers into the open mouths of a pair of cartons 18, or their container liners. Directly below the finger-operating mechanism 17 and secured in any suitable manner from the frame uprights there is a beam scale, designated generally 19 and seen more clearly in Figure 13. The pan of the scale is positioned a distance below the finger-operating mechanism sufficient to accommodate the height of a carton (Figure 13).

Conveyor belt mechanism

The sprocket 10 of the main drive shaft (Figure 1) drives a sprocket 20 through the chain 21. The sprocket 20 is secured to the auxiliary cam shaft 5 (Figure 4) which is journalled on the truss framework 4. This shaft carries at the end opposite the sprocket 20 a bevel gear 22 which meshes with a bevel pinion 23 carrying a sprocket 24. The latter drives a sprocket 25 through a chain 26, the sprocket 25 being mounted on a shaft 27 journalled on one of the horizontal trusses of the frame. The shaft 27 is provided with a pulley 28 intermediate its ends, which serves to drive a conveying belt 29 (Figure 6). The belt 29 is carried at the end opposite the pulley 28 by a pulley (not shown). This belt constitutes the so-called outgoing conveyor. The shaft 27 has mounted thereon a sprocket 30 which drives a sprocket 31 through a chain 32. The sprocket 31 is carried on a shaft 33, journalled on the same truss as the shaft 27, and has mounted thereon a pulley 34 which serves to drive the so-called incoming belt 35. This belt is carried at the end opposite the pulley 34 on a pulley (not shown). It is evident that inasmuch as the pulleys 28 and 34 are in the same horizontal plane, the upper surfaces of the belts 29 and 35 are at the same level.

To one side of the incoming belt 35, as seen in Figure 6, and at the same height as the belt, there is a platform 36 which is adapted to receive a pair of cartons as they are delivered from the belt 35 to the platform by the so-called side and end pusher mechanism, which will be described presently. The pulley 28 is spaced in a horizontal direction from the platform 36 sufficiently to accommodate the pan of the beam scale which is generally indicated at 19 (Figure 6). The pulleys 28, 34 are rotated in such a direction that the belts 29, 35 are moved from the right to the left, as indicated by the arrows in Figure 6, so that if cartons are placed on the right-hand end of the belt 35 the cartons will move from the right to the left until they reach a rigid stop member 38, and by means of mechanism which will be hereinafter described, these cartons are moved transversely of the belt onto the platform 36 and pushed along the platform onto the pan 37 of the beam scale, and afterwards moved onto the outgoing belt 29 to be delivered to the next machine in line, usually a top sealer. In order to prevent the carton from falling off the belts, there may be provided on opposite sides of each belt a pair of guide rails 39 (Figure 1) which extend the entire lengths of the belts.

Mounted on the shaft 27 (Figure 6) there is a sprocket 40 which mechanically drives a sprocket 41 through a chain 42. The sprocket 41 is journalled in any suitable manner, and is secured to a knurled roll 43 positioned in line with the scale pan 37. This pan, as can be seen in Figure 1, is at a slightly lower level than the upper surface of the outgoing belt 29, and when the roll 43 is rotated in the same direction as the belt it will serve to elevate the forward edge of each filled carton as the cartons pass over the scale pan onto the outgoing belt.

Carton cross-slide mechanism

It has been pointed out that as the cartons are moved against the stop 38 (Figure 6) by the conveyor belt 35 a number of cartons, preferably a pair, is moved transversely of the belt onto the platform 36. This transverse movement is obtained by the action of a cross-slide plate 44 having a bent portion 45. This plate is moved across the belt 35 by a cam and roller mechanism, which will be described in connection with Figure 9. As the plate is moved to its innermost position the bent portion 45 prevents any cartons being conveyed by the belt 35 into the space swept by the cross-slide 44.

The actuating mechanism for the cross-slide member consists of a cam 46 which is mounted on the main cam shaft 6, as will be seen more clearly in Figures 2, 3 and 9. This cam shaft 6 is journalled at 47 to the outside members of one of the transverse trusses of the frame and carries practically all of the cams employed in the machine except the so-called machine stop cams and mechanism, and also the so-called feeler cams. The last-mentioned cams are carried on the auxiliary cam shaft 5. The main cam shaft 6 is actuated through a sprocket 48 and chain 49 (Figure 3) from a sprocket 50 which is carried on the auxiliary cam shaft 5. The cross-slide cam 46, preferably of the grooved type, accommodates a roller 51 (Figure 9) carried by a bellcrank lever 52 which is pivoted to a link 53. The latter is pivotally secured to a lever 54, pivoted approximately at the center of the lever and secured at its opposite end to an adjustable connecting rod 55. This rod is pivotally secured to a lever 56, the latter being fixedly connected at its opposite or upper end to a shaft 57 (Figure 6).

The shaft 57 is provided at each end with a pair of arms 57', to which are attached the cross-slide plate 44 through the bars 58. The ends of the bars 58 opposite the cross-slide plate 44 are extended beyond the arms 57' as indicated at 59, and are pivotally connected to a pair of diagonally positioned bars 60 (Figure 9) which are pivotally secured to extensions 61 leading off the frame. The purpose of the extension 59 and the bars 60 is to assure a perfectly horizontal movement of the bar portions 58 which carry the cross-slide element. It will be seen that as the cam 46 (Figure 9) is rotated the lever 52 is oscillated, which movement is transmitted through the linkage shown in Figure 9. This causes the lever 56 to oscillate about its shaft 57 to cause the cross-slide element 44 to move inwardly across the belt 35 (Figure 6) as far as the innermost edge of the belt, and then to be retracted to its initial position. The length of the cross-slide element 44 is preferably such as to move two cartons at a time onto the platform 36.

End pusher mechanism

It has been pointed out hereinbefore that when the cartons reach the platform 36 a pusher is operated to move the cartons from the platform successively onto the scale pan 37. This end pusher is designated 63 in Figure 6, and is shown therein as being moved to its fully forward position. It will be noted that the pusher face 64 is so positioned with respect to the scale pan as to permit only the second of each pair of cartons to remain on the scale pan for weighing. The first carton of each pair will rest on the moving belt 29, but will be prevented from moving with the belt by the hook 65, the operation of which will be described hereinafter.

The pusher 63 is moved from right to left (Figure 6), and derives this movement from a cam 66 (Figure 9) of the grooved type. This cam is mounted on the main cam shaft 6. A roller 67 moves in this groove, and this roller serves to oscillate a bell-crank lever 68 about its pivot 69. The lever 68 is connected through a link 70 to a bellcrank lever 71 pivoted at 72, and adapted to give a vertical movement to a connecting rod 73. The latter is connected through a crank 74 to a shaft 75 (Figure 1), to which is secured a lever 76 which carries the end pusher 63 in any suitable manner. An additional lever 78 may be provided to give a "parallelogram" movement to the actuating lever 76 so as to cause the pusher 63 to move in a strictly horizontal direction. It will be seen from Figure 9 that the cams 46 and 66 are so positioned on the shaft 6, and the respective lever arrangements are such that the cross-slide element 44 will operate ahead of the end pusher plate so that a pair of cartons is moved transversely of the belt 35 by the element 44, and immediately upon reaching the platform 36 (Figure 6) the end pusher plate 63 will move the cartons longitudinally of the machine, permitting the second of each pair of cartons to remain temporarily on the scale pan 37.

Stop hook-operating mechanism

It has been pointed out hereinbefore that the hook 65 is for the purpose of temporarily stopping the travel of the cartons on the belt 29 at a position immediately below the filling hopper 11. As seen in Figure 6, only one hook is employed, this hook being given a movement from a vertical position to a horizontal position extending in toward the line of cartons traveling on the belt 29 by means of a cam 79 secured to the main cam shaft 6 (Figures 2 and 3). A roller 80 is spring-urged against the periphery of the cam 79, this roller being carried on the end of a lever 81 (Figure 3) which is pivoted at 82, the movement of the lever 81 being transmitted to a lever 83. This movement is communicated through a connecting rod 85 to a hub 86 mounted on a shaft 87. The stop hook 65 is secured to this hub so that as the cam 79 is rotated the roller 80 and the connecting linkage will cause the stop hook to move from its initial vertical position to a horizontal position, which is the position shown in Figure 6.

It will be noted that there is a jog in the guide rails 39 directly opposite the stop hook, as indicated by the reference character 88. The purpose of this jog will be explained particularly with reference to Figure 7. The purpose of the hook 65 is to stop each unit pair of cartons from being moved to the left by the belt 29, on which the first of each carton pair temporarily rests while in filling position. The movement of the hook 65 must be so timed as to bring the hook into its horizontal position the instant the first carton of each pair reaches the hook position. In the absence of the jog 88, and assuming that the timing of the hook were not precisely accurate, it is apparent that the downward movement of the hook might cause a puncture of the carton by the hook, which would tend to press the carton against the opposite guide rails 39. However, by providing the jog 88 the hook 65 can be moved to its horizontal position an appreciable time before the first carton of each pair reaches the stop position, and as the hook strikes the second carton 89 it will simply move the rear edge of this carton into the space formed by the jog 88 without causing any damage. The hook will then be in position to stop the first carton 90 of the succeeding carton pair. Thus there is no longer any necessity for a split-second timing of the movement of the hook 65, and yet the hook will always be in position to prevent movement of the carton pair which is temporarily resting in the filling position until the hook is removed and each carton is carried along by the belt 29.

Check weigher

This mechanism is shown more clearly in Figures 19, 20 and 21. The scale is of the beam type, the beam being indicated by the reference numeral 91 and having a knife edge balance 92. The scale pan is indicated at 93, which carries a number of uprights 94 with guide rails 95 to support a carton. The pan 93 is pivotally mounted on a knife edge 96 to which is connected a system of levers 97, one end of which is carried back to the main knife edge axis in order to assure an approximately vertical movement to the scale pan when the beam 91 moves either upwardly or downwardly from its balanced position. The beam 91 is provided with an adjustable counterweight 98 and a bolted extension 99 which carries a horizontally extending plate 100. This plate is provided with a pair of slitted apertures 101 (Figures 19 and 21), one of said apertures being positioned below the median line of the plate and the other aperture above this line.

Beyond the plate 100 and in line with the apertures 101 there is a pair of lamps 102, contained within cylindrical reflecting shields 103, the bulbs of the lamps being directed toward the apertures 101. Directly behind the plate 100 i. e. on the opposite side from the lamps 102 there is a pair of light-proof casings 104, each containing a photo-electric cell 105. The casings 104 are provided with apertures 106 which are closed off by metal caps 107 having rectangular openings 108 therein. These openings are both positioned preferably in line with the median line of the plate 100, as can be seen in Figure 21. It will be understood that the scale and all of the lamp and photoelectric tube apparatus are secured to the frame of the machine in any suitable manner. Projecting inwardly from the frame there is a flanged member 109 terminating in a U-shaped section 110, in which is disposed a pair of oppositely positioned set screws 111, the purpose of which is to prevent excessive movement of the plate 100 as the scale is deflected either upwardly or downwardly.

It is apparent that when a carton is placed in position on the pan 93 and is being filled from an overhead hopper, the construction of which will be described hereinafter, the unbalance of the scale beam 91 will indicate as to whether the contents of the carton are in accordance with a predetermined standard as set by the counterweight 98. Assuming that the contents of the carton are less than the predetermined standard, the left-hand portion of the beam 91 (Figure 20) will move upwardly, causing the extension 99 to move downwardly and carrying with it the plate 100. This downward movement of the beam extension 99 will cause the right-hand opening 101 (Figure 21) to align itself with the opening 108 in the cap 107. Thus light can be transmitted from the lamp 102, through the aligned openings, into the photo-tube 105. Again if the contents of the carton were heavier than the predetermined standard, the beam 91 will move downwardly, causing the extension 99 to move upwardly, and this movement will bring the left-hand aperture 101 (Figure 21) into alignment with the aperture 108. Light from one of the lamps will again pass through the aligned openings into the photo-tube 105 at the back of these openings.

As will be explained in connection with the hopper shown in Figure 22 and the electrical system shown in Figure 28, the activation of one or the other of these photo-tubes 105 serves to regulate the amount of material which is dumped into the carton positioned on the scale pan. Inasmuch as the beam scale is of a highly sensitive character, it is necessary to clamp the beam in its balanced or neutral position during those periods when no carton is resting on the scale pen. In this connection, it has been pointed out that the cartons are moved in pairs by the end pusher 63 (Figure 6). The movement of this pusher is such that while both of the cartons pass over the scale pan, only the second of the two cartons comes to rest on the scale pan for weighing.

*Scale gripping mechanism*

The scale beam is held in its neutral or balanced position by a gripper mechanism indicated generally by the reference numeral 112 (Figure 20). The cam for actuating this mechanism is indicated at 113 mounted on the main cam shaft 6 (Figure 2). A roller 114 is spring-urged against the periphery of the cam, and oscillates a lever 115 (Figure 13) which is connected to a hub 116 on a stub shaft 117 journalled in any suitable manner to the frame of the machine. A lever 118 is taken from the hub, and is pivotally connected to a link 119 and a connecting rod 121 (Figure 13). The latter is pivotally secured to a lever 122 (Figure 4). The lever 122 is adapted to rotate on the pivot 123, and carries on its opposite end a hub 124 in which is screwed a bolt 125. The lower end of the latter presses down on the upper surface of the scale beam 91. A stop 126 may span the lever 122 in order to limit its throw. Directly below the bolt 125 there is a companion screw bolt 127, which is adapted to contact with the lower surface of the scale beam 91 and is given a vertical reciprocatory movement through a bellcrank lever 128 pivoted at 128' and a lever 129, having one end pivotally secured to the lever 122.

The arrangement is such that as the connecting rod 121 is given a downward movement (Figure 4) by the cam 113 the oppositely positioned bolts will move away from the scale beam, allowing the latter to oscillate if necessary about its knife edge 92. However, when the connecting rod 121 is pulled upwardly, the bolts 125 and 127 are moved toward one another rigidly to clamp or grid the scale beam, to hold the latter in its neutral or balanced position. The cam 113 (Figure 2) is so orientated on the shaft 6 as to move the bolts 125 and 127 away from one another only during that period of time that the second carton of each carton pair comes to rest on the scale beam.

*Hopper feeding mechanism*

The hopper 11 is carried on the uppermost truss of the framework and is positioned directly over the pair of cartons, one of which rests on the scale pan and the other on the moving belt 29, but is temporarily arrested in this position by the stop hook 65. The hopper consists essentially of a cylindrical drum 130 having a transverse partition 131 midway of its length, and provided with a large inlet opening 132 formed by a vertically extending portion 133 of the drum. The drum terminates at its lower lateral side in a pair of spouts 16, positioned adjacent one another, and of rectangular configuration with tapered sides. The shape and dimensions of each spout are such as to conform to the dimensions of the mouths of the cartons 18. The latter are usually provided with a liner or sack made of wax paper, in which case the member 16 is of a size approximately to fit the size of the sack or liner.

Within each compartment of the drum there is provided a four-bladed paddle wheel 134, which forms quadrantal compartments, and each paddle wheel is mounted on a shaft 135 which is adapted to be rotated by a gear 136 (Figures 1, 2 and 3), positioned just outside the ends of the drum. These gears are actuated by pinions 137 mounted on a shaft 138 which carries a sprocket 139, one end of which is journalled in any suitable manner on the frame. The sprocket 139 is given an intermittent motion by a modified form of Geneva movement through the chain 140 and the sprocket wheel 141 (Figure 2). The Geneva wheel 142 (see Figures 10 and 11) is mounted on a shaft 143 which carries the sprocket 141, this shaft being positioned near the main cam shaft 6. The wheel 142 is provided with four upraised portions 144 of such a length as to leave between adjacent ends of the portions, four equidistantly spaced grooves 145. Each upraised portion is also provided with a slot 146 which extends the entire width of the wheel, thus making four slots in all equidistantly spaced about the periphery of the wheel. In order to secure the Geneva wheel and the sprocket 141 together, pins 147 which fit into openings 148 (Figure 11) may be provided. The wheel 142 is keyed to the shaft 143. Mounted on the shaft 6 there is a cam 149 with adjustment screws 150, and provided with a spring-urged roller 151 having a pin 152. This pin is adapted to fit into an opening 153 carried by a dog 154 which is pivoted at 155. This dog 154 is provided with a rectangular finger member 156, which is adapted to be inserted into the grooves 146 at certain angular positions of the cam 149. The shaft 6 also carries a hub 157 which has a radial extension on which is mounted a roller 158.

It is apparent that as the cam shaft 6 is being continuously rotated, in the manner described hereinbefore, the roller 158 will describe a circular path, and during a portion of this circulatory movement will pass upwardly through one of the grooves 145, skirt across the inside edge of the upraised portion 144, and will move in a radial direction outwardly along the next groove 145, causing the wheel 142 to move approximately 90 degrees. As the roller reaches the lower edge of the groove 145 and its circular movement causes it to move upwardly through the groove, it skirts across the inner edge of the next upraised portion 144, repeating this operation successively and causing the wheel 142 intermittently to rotate through a 90-degree angle. Thus the sprocket 141 is similarly intermittently rotated, and this rotation is carried through the chain 140, the sprocket 139 to both pinions 137, whereby the paddle wheel 134 in each drum compartment is moved successively through a ninety-degree angle. It is obvious that the number of slots 145 necessarily correspond to the number of compartments formed by the paddle wheel.

It is further apparent that the motions imparted to the Geneva wheel 142 by the roller 158 are such that the wheel starts off gradually from its stationary position, that is without shock, when the roller enters the innermost edge of the groove 145, causing the wheel to accelerate until the roller reaches the lowermost portion of the slot 145, after which the wheel is decelerated in speed while the roller returns upwardly out of the slot until as the roller leaves the innermost portion of the slot the wheel 142 has become stationary again. In other words, the operation of this modified form of Geneva movement is such that the paddle wheel 134 starts its quadrantal movement without shock and stops also without shock, thus insuring long life to the paddle wheel and its bearings.

The dog 154 is employed to prevent undesired backward movement of the wheel 142 during the time that the roller 158 leaves the innermost portion of one of the slots 145 and is moving across the wheel 142 to enter the inner portion of the adjacent slot. As the cam 149 rotates the roller 152 is caused to move inwardly over the smaller diameter of the cam, and this movement causes the dog 154 to swing about its pivot 155 and periodically to enter the slots 146 after the wheel 142 has terminated its indexing movement. When the wheel 142 is ready to be indexed around another quarter turn at the moment the roller 158 enters the inner portion of the groove 145, the dog 154 is retracted by its cam 149 and again moved into the next adjacent slot 146 on conclusion of the indexing motion of the wheel 142. The positions of the Geneva wheel 142 and the cam 149, on their respective shafts, are such that the fluent material in the quadrantal compartments formed by the paddle wheel 134 will flow as individual batches or charges into the cartons or sacks which have been positioned under the spout 16 by the end pusher 63. There are two spouts communicating respectively with each of the two halves of the hopper so that a pair of cartons may be filled simultaneously. If desired, a semi-circular shield 159 (Figure 10) may be provided over the entire Geneva mechanism for protective purposes.

*Hopper volume-adjusting mechanism*

Each end of the hopper is provided with an adjustable wall which determines the size of the quadrantal compartments formed by the paddle wheel. These walls are constituted of a pair of hollow drums 160 which carry the gears 136, and are provided with four equidistantly spaced radially extending slots 161 which receive the blades of each paddle wheel (Figure 22). A flanged hub member 162 is bolted to each of the gears 136 and each of the flanged members carries a threaded rod 163 which extends outwardly from the gear 136 and in line with the axis 135 of the paddle wheel.

The drum 136 is provided at each end with a pair of overhanging bearing members 164 for supporting the rods 163. The inner bearing member 164 is provided with a threaded bushing member 165, to which is secured a sprocket 166. By rotating these sprockets the bushing member 165 is also rotated, causing the threaded rod 163 to move to the right or left (Figure 22), depending on the direction of rotation of the sprocket 166. The rotative effort for turning the sprockets 166 is obtained initially through a gear 167 (Figures 2, 3 and 22) mounted on the main cam shaft 6. This gear drives a smaller gear 168 mounted on the shaft 169 (Figure 3) which is journalled in any suitable manner to the frame, as indicated at 170.

This shaft 169 carries a sprocket 171 over which moves a chain 172 for rotating a sprocket 173. The sprocket 173 is carried on a shaft 174 to which is secured a sprocket 175 on its opposite end. A chain 176 drives a sprocket 177 (Figures 3 and 12) which is mounted on a shaft 178 carrying at its opposite end a sprocket (see Fig. 22) in line with the left-hand sprocket 166, as shown in Figure 3. A chain 179 connects the two last-mentioned sprockets. The shaft 178 carries at its extreme end, opposite the chain 179, a sprocket 180 in line with the right-hand sprocket 166 (Figure 3) and chain 181 connecting the two last-mentioned sprockets. Thus as the gear 167 is rotated, this rotary movement is communicated through the chains 172, 176 and 179 or 181 directly to both of the sprockets 166, which will cause the movable wall 160, connected to those sprockets through the threaded rod 163, to move longitudinally of the hopper axis.

The rods 163 are threaded in opposite directions so that as the sprockets 166 are rotated in the same direction the walls 160 will move in opposite directions. The sprocket 171 is loosely mounted on the shaft 169 but is connected to the shaft through clutch mechanism generally designated 182 (Figure 22), the operation of which will be described hereinafter. In order to rotate the sprockets 166 in the reverse direction so that the movement of the walls 160 is correspondingly reversed, provision is made for reversing the direction of rotation of the sprocket 175. For this purpose the shaft 169 carries a sprocket 183 which drives a sprocket 184 (Figure 3) mounted on a shaft 185.

This shaft 185 carries at one end a gear 186 which meshes with a gear 187 (Figure 13) secured to the shaft 174 on which the sprocket 175 is mounted. Thus as the gear 167 is rotated the rotary effort is communicated through the gear 168, sprocket 183 to sprocket 184, through the gear 186, gear 187, through the shaft 174 to the sprocket 175, and through the chains 176, 179, 181 to the hopper sprockets 166. The function of the sprockets 183, 184 and the gears 186, 187 is to cause the sprocket 175 to rotate in the opposite direction to that direction which it had when the drive was taking place through the chain 172 and the sprocket 173. The gears 186, 187 are therefore reversing idlers. The sprocket 183 is loosely mounted on the shaft 169, as is also the sprocket 171, but is connected to the shaft through a clutch mechanism similar to that designated 182 in Figure 22. It is apparent that since the sprockets 171 and 183 tend to rotate the sprocket 175 in opposite directions the mechanism 182 must be such as to disengage one or the other of the sprockets 183 and 171 at one time.

At the position of each clutch mechanism there is a pair of cams 189, 190 mounted on the main cam shaft 6. The roller 191 which bears against the periphery of the cam 189 is mounted on the end of a T-shaped lever 192 which is pivoted at 193. The end of the lever opposite the roller 191 bears against the compression spring 194, secured to the frame of the machine. The lever 192 has a depending portion 195 which terminates in a bifurcated extension 196. The latter straddles the driving portion 197 of the clutch mechanism which is keyed to the shaft 169. The clutch portion 197 is provided with an annular groove 198 in which ride rods or fingers 199, projecting inwardly from the bifurcated extension 196. The clutch portion 197 is provided on its inner side with a jog indicated at 200, which abuts a corresponding jog 201 on another portion 202 of the clutch, to which is secured the sprocket 171. The latter is shown in Figure 22 in purely diagrammatic form as a pulley which carries the chain 172, diagrammatically illustrated as a belt. All other chains and sprockets are similarly shown as belts and pulleys, respectively, in the interests of clearness.

It is evident that as the cam 189 is rotated the T-shaped lever 192 will rock on its pivot 193, causing the clutch portion 197 to engage and disengage with the other clutch portion 202. However, there is a provision for preventing the lever 192 from rocking in this manner, the arrangement being such that the clutch portion 197 is moved away from the clutch portion 202 and is brought into engagement only when adjustment need be made in the volume of the hopper 11. This provision is constituted of a locking mechanism which is composed of the cam 190 and associated elements. A roller 204, spring-urged against this cam, is carried on the end of a lever 205 which is secured to a shaft 206. On the latter there is mounted a vertically extending latch 207, to which is secured a tension spring 208. This latch has a cutaway portion, preferably having a back beveled vertical edge 209 (Figures 23 and 24). A small bellcrank lever 210, pivoted at 211, has an upper arm 212 which fits the beveled cutaway portion, and a lower arm 213 which contacts the upper surface of the lever 192. A link 214 is taken from the upper arm 212 (Figure 22) to the armature 215 of an electromagnet 216.

It is apparent that as the electromagnet 216 becomes energized, in a manner which will be described presently, the armature 215 tends to lift the arm 212 of the bellcrank lever upwardly, and thus tends to move the arm 213 away from the upper surface of the lever 192. However, the arm 212 is restrained from being moved upwardly by the action of the spring 208 until the shaft 206 is rotated counter-clockwise by the action of the cam 190 and the roller 204. The rotation of this cam will cause the lever 205 to oscillate, which in turn, will oscillate the lever 207 away from and toward the upper arm 212. While the lever 207 is moved away from the beveled edge of the arm 212 the electromagnet 216, upon energization, will then move the lower arm 213, permitting the lever 192 to rock and causing the clutch portion 197 to make contact with the portion 202.

The upward pull on the link 214 will cause the lower surface of the arm 212 to ride on the upper end surface of the lever 207, thus momentarily locking the arm 213 out of contact with the lever 192. The relative positions of the cams 189 and 190 on the shaft 6 are such that when the electromagnet 216 is energized and the clutch portions 197, 202 engaged, motion is transmitted from the gear 167, through the clutch and sprockets to the hopper sprocket 166, turning the latter through only a predetermined number of revolutions. Thus the distance through which the movable wall 160 of the hopper moves for each time the electromagnet 216 is energized is limited. It will be understood that there are two clutch mechanisms employed in the machine, one of which controls the rotation of the sprocket 171 (Figure 3) and the other controlling the rotation of the sprocket 183. The clutch mechanism 182, shown to the right in Figure 3, is for the purpose of correcting overweight of the carton, while the clutch mechanism 182, shown to the left in Figure 3, corrects under-weight. These clutch mechanisms are substantially the same, as indicated on the drawings and accordingly, the component parts thereof carry the same reference characters.

*Electrical circuits and control mechanism for operating the clutch electromagnets*

The electromagnets 216 for controlling the clutch mechanism 182 are energized, respectively, by the photo-electric circuits shown in Figure 28. It has been pointed out that when a carton, after being filled, and resting on the scale pan 93 is under-weight, the scale beam 91 is tilted upwardly (Figure 20), bringing the right-hand aperture 101 (Figure 21) into line with the aperture 108 so that light shines between one of the lamps 102 and its corresponding photo-tube 105. The lamps 102 are connected in parallel across the secondary of a transformer 217, which is energized from the main terminals 218 of an alternating current source. There is a manually operated switch 14 connected in this line.

Each photo-electric cell 105 is energized through a direct current source 219 and a resistance 220, the cathode of the photo-tube being connected by a conductor 221 to the grid 222 of a thyratron. In addition to the grid, the thyratron includes an anode 223 and an indirectly heated cathode 224, the heater 225 of which is energized through a transformer 226, connected across the mains 218. The grid 222 is biased negatively by a battery 227. The anode is connected through a fuse block 228 to the electromagnet 216, and thence through a mercury switch 229 of the closed type, and finally back to the mains through a conductor 230 and a time delay switch 231. It will be understood that both of the photo-tubes 105 have identical circuits but use different electromagnets 216 and different switches 229, but both use the same time delay switch 231. The purpose of the switches 229 will be described hereinafter.

When light is permitted to pass between one of the lamps 102 and its corresponding phototube 105, the grid 222 of its corresponding thyraton becomes charged more positively due to the reduced resistance of the photo-electric tube on activation. The gas in the thyratron then ionizes, permitting current to pass through the thyratron and to energize one of the electromagnets 216 since the switch 229 is in a horizontal closed position. The purpose of the time delay switch 231 is to prevent the application of high voltage plate current to the thyratron until after a certain time interval, usually about five minutes, when the cathode 224 has been heated to its full operating temperature. This action prevents the destruction of the cathode by excessive positive ion bombardment. Thus when the switch 14 is closed for the first time, the electromagnet 216 cannot be energized regardless of the energization of the photo-electric tube 105, until at the end of a time period determined by the time delay switch 231.

Inasmuch as each of the electromagnets 216 becomes energized when its respective photoelectric tube 105 is light-activated, it is apparent any deflection of the scale beam 91 above or below its balance position, depending on whether the contents of the carton are under-weight or over-weight, will tend to rotate the bellcrank lever 210 of that clutch mechanism 182 which pertains to the particular electromagnet. For example, let us assume that the carton is over-weight and consequently it is desired to decrease the charge of fluent material deposited in the succeeding cartons. In that case it is necessary that the adjustable walls 160 of the hopper be moved toward one another to decrease the size of the quadrantal compartments. The downward tilt of the scale beam will energize the left-hand electromagnet 216 (Figure 28), and the bellcrank lever 210 (Figure 22) will be rotated when the lever 207 is moved out of the way by the action of the cam 190, thus causing the closure of the clutch mechanism and rotating the hopper sprockets 166 in a counter-clockwise direction, as seen at the left-hand end of Figure 22. A few rotations of the sprocket 166 are given at this time until the next pair of cartons is placed on the scale, and if the contents of these cartons are still over-weight the electromagnet 216 is reenergized to cause further rotation of the hopper sprockets 166. This operation is continued until finally the cartons and their contents are exactly in accordance with the predetermined standard.

The thyratron opposite to that referred to immediately above in Figure 28 will be operated if a carton and its contents are under-weight, in which case the other of the two clutches 182 is actuated to turn the hopper sprocket 166 in a clockwise direction, as seen in Figure 22. This operation will cause the walls 160 to move away from one another, thereby increasing the size of the hopper. It is apparent that by the use of the photo-electric tube 105 and the slits 101 in the beam plate 100, it is possible to obtain very accurate adjustments of the walls 160 in order to adjust the weight of the carton contents absolutely equal to the predetermined weight.

It is apparent that the scale beam has secured thereto only the plate 100 and this member floats, i. e. it does not make contact with any other member except the set screws 141 (Figures 20 and 21). Inasmuch as this plate may be made of light material, preferably aluminum stock, its weight is practically negligible in so far as producing a drag on the scale beam is concerned. Thus the movements of the beam are strictly in accordance with the variation in the different loads applied to the scale beam and greater accuracy of measurement is obtained, also a closer adjustment of the measuring hopper to bring the weight of each carton to the predetermined weight.

The mercury switches 229 are employed for the purpose of preventing excess movements of the walls 160, either in the outward or the inward direction. These switches are contained in a casing 232 mounted on top of the machine, and in line with the hopper. The switches are carried on plates 233 which are pivoted at 234. One of the plates has a horizontally extending arm 235, to which a tension spring 236 is attached. There is a screw 237 which normally holds the plate 233 in a vertical direction against the spring 236. One of the plates 233 has an upwardly extending arm 238, which carries a spring 239 attached to an arm 240 which is secured to a third plate 241. The third mercury switch 242 is secured to the plate 241, and it will be noted that this switch is normally in a tilted position. The purpose of this third switch and the fact that it is in a tilted position will be explained hereinafter.

Projecting into the side of the casing 232 is a shaft 243 which comprises an extension of the shaft passing through the hopper. This shaft carries a collar 244, on which is mounted a finger 245 of such configuration that when the shaft 243 is withdrawn from the casing the finger 245 will contact with the arm 238 and cause the right-hand switch (Figure 25) to be tilted. The shaft 243 also carries a collar 246, to which is secured in any suitable manner a finger 247 which extends along the length of the casing, and is of such a shape as to strike the arm 240 when the shaft 243 is moved farther into the casing.

Now assume that the scale 91 has continually called for a decrease in the size of the charge being delivered to the cartons due to overweight, so that the hopper walls 160 have been moved inwardly toward one another. The shaft 243 being connected to one of the threaded rods 163 will move to the right (Figure 25). The finger 245 will move nearer and nearer to the arm 238, until at the time the hopper walls have reached their safe maximum inward movement, the finger will cause the right-hand switch 229 to tilt, thus opening the thyratron circuit of its photoelectric system to deenergize its corresponding electromagnet. No farther inward movement of the walls 160 is possible.

On the other hand, if the carton is underweight so that the shaft 243 moves to the left (Figure 25), indicating that the hopper compartments are being increased in volume, the finger 250 on collar 246 will move steadily toward the plate 233 and eventually will strike the plate, causing the middle switch 229 to tilt, and preventing farther movement outwardly of the hopper walls. Thus the switches 229 simply set the outward and inward maximum limits of travel of the hopper walls in response to the indications initiated by the scale beam.

It will be noted that as the shaft 243 moves inwardly of the casing, the finger 247 will strike the arm 240 and move the tilted switch 242 to its horizontal closed circuit position. This switch is connected in series with an electromagnet 251 (Figure 28), and energized by the current terminals 218 through the manual switch 14. When the switch 242 (Figure 25) is moved to its horizontal or closed contact position, the electromagnet 251 is energized to operate a shaker by which the contents of the carton are caused to settle. It will be understood that the necessity for shaking the carton arises only when the volume of the hopper has been increased, thus indicating that the fluent material is of less weight per unit volume than the previous batch or charge. In such case the shaft 243 may have moved inwardly of the casing to its maximum position.

Shaker mechanism

This mechanism is constituted of a shaker wheel 253, positioned under the upper level of the outgoing belt 29 (Figure 1) so that upon rotation the wheel will jiggle the belt, causing the contents of the carton passing over that section of the belt to be shaken down, thus facilitating the closing of the flaps of the carton by the succeeding top sealer machine. The shaker wheel 253 is mounted on a shaft 254 (Figures 5 and 6), journalled on the frame in any suitable manner. A sprocket 255 is loosely mounted on the shaft 254, and secured to this sprocket there is a ratchet wheel 256. Thus the ratchet wheel and the sprocket are both free to turn on the shaft. Abutting one side of the ratchet wheel 256 there is a circular plate 257, carrying a pawl 258 (Fig. 4) pivoted at 259. This plate is secured to the shaft 254, as can be seen in Figure 5. The sprocket 255 is continually rotated by a chain 260 which passes over a sprocket 261 secured to the shaft 21. Directly below the pawl 258 there is a bellcrank lever, pivoted at 262, having an upper arm 263 and a lower arm 264. The arm 263 is of such a length that when the lever is moved clockwise (Figure 5) around its pivot, this arm will be moved away from the pawl 258, but when rotating in a counter-clockwise direction the arm will bear against the plate 257 and will move in the path of the tail of the pawl.

The arm 264 is pivotally secured to a link 265 connected to the plunger of the electromagnet 251 (Figures 4 and 28). This electromagnet is so designed that when it is energized it will push the link 265 upwardly, moving the arm 263 to the right, thus permitting the pawl 258 to be spring-pressed into the path of the ratchet wheel 256. Under these conditions the plate 257 will be rotated with the ratchet wheel, causing the shaft 254 to rotate, thereby operating the shaker wheel 253.

It will be recalled that when the walls 160 of the hopper are moved outwardly to provide a greater volume to the quadrantal compartments in case the volume of the fluent material runs greater per unit weight, the rod 243 (Figure 25) is moved to the left and causes the switch 242 to assume a horizontal position. Thus a circuit is established through this switch and the electromagnet 251 (Figure 28), causing the arm 263 to move to the right (Figure 5) and permitting the shaker 253 to operate. There is therefore a direct connection between an increase in volume of the hopper and the rotation of the shaker, as the movement of the hopper walls indicates that the cartons are being filled above the levels proper for packaging, and the shaker serves to settle the material down to the proper level. Upon retraction of the hopper walls 160, due to a greater density of the fluent material, the switch 242 is restored to its tilted position by the action of the spring 239 (Figure 25), and the rotation of the shaker is stopped. A safety latch 266 (Figure 4), which is adapted to fit into a jog in the plate 257, is provided to prevent the plate from accidentally rotating in the wrong direction.

Finger-operating mechanism

The purpose of the fingers and their operating mechanism, about to be described, is to maintain the mouths of the cartons, or their contained liners, open while in the filling position. Referring particularly to Figures 1, 8 and 29 to 33, it will be noted that around the lower edges of the spouts 16 there is provided a series of shafts 267 having beveled gears 268 at appropriate positions, the shafts being parallel. The bevel gears mesh with the gears 269, which are secured to shafts 270 positioned diagonally of the corners of the spouts. Fingers 271 are carried on the shafts 270, these fingers being positioned directly at the corners of the spouts, the arrangement being such that as the bevel gears 268 are rotated in any suitable manner, the fingers 271 will move from a normally horizontal position to a vertically downward position through 90 degrees. These fingers are of such length as to engage the corners of the pair of cartons in position under the spouts, or in case the cartons contain liners or sacks, the fingers serve to maintain the corners of the liners in an open position. The shafts 267 are given an oscillatory movement through an arm 272 and a connecting rod 273, which is pivotally connected to a lever 274 (Figure 13). The latter is secured to a shaft 275 journalled on the frame in any suitable manner.

There is a lever 276 connected to the opposite end of the shaft from the lever 274 (Figures 8 and 12), and pivotally secured to this lever is a connecting rod 277. This connecting rod is pivotally secured to a bellcrank lever 278 (Figures 2 and 12) pivoted at 279. The other end 280 of the bellcrank lever carries a roller 281. The latter is spring-pressed against a cam 282 secured to the main cam shaft 6. As this cam is rotated the shafts 267 are given an oscillatory movement, which causes the fingers to move downwardly and upwardly, thus maintaining the four corners of each carton open at the proper time. The position of the cam is such that these fingers are moved to their downward position only during the filling operation of the carton. In addition to the fingers 271, there is provided other means for assuring a full opening of each carton.

Above the line of shafts 267 (Figures 29 and 30) there is an additional line of shafts 283 provided with intermeshing bevel gears 284, these shafts carrying fingers 285 (Figure 31) having a configuration such that just their tips contact with the carton or its liner. These fingers, of which there are two per carton, are positioned approximately midway between the ends of the carton. It is apparent that the fingers 285 serve to prevent bowing of the sides of the carton or its liner, and together with the corner fingers 271 assure a fully open condition of all parts of the mouth of the carton or liner, whereas in prior typical machines which employ only the corner fingers, it was found desirable to elevate the cartons into filling position so as to bring the top edge of each carton or its liner quite close to the bottom surface of the spout. However, by the use of the intermediately positioned fingers 285, which will be termed "bag-spreading fingers" as distinguished from the corner fingers which will be termed "bag-opening fingers", it has been found unnecessary to elevate the cartons into filling position but simply to rely on all of the fingers, including the spreading fingers, to prevent any loss of fluent material around the sides of the carton.

The shafts 283 are given an oscillatory movement through a crank 286 and a connecting rod 287, which is pivoted to a crank 288 (Figure 18). The latter forms part of a bellcrank lever pivoted at 289, the other arm of which carries a roller 290. The latter is adapted to be actuated by a cam 291 secured to the main cam shaft 6. As in the case of the corner-positioned fingers 271, the intermediate fingers 285 are moved from a horizontal to a downwardly vertical position during the filling operation of the cartons.

From the foregoing it is evident that I have provided bag opening fingers, both at the ends and on the sides of each carton or the liner contained therein, the corner fingers stretch the sides of the bag tight and at an instant afterwards, the side fingers come in to bow the sides of the bag outwardly which makes it possible to fill the bag without spilling.

Machine stop and feeler mechanism

It is desirable that the machine be provided with means for detecting the absence of empty cartons on the incoming belt, for otherwise unless cartons are being fed to the hopper the latter would dump its successive charges onto the machine and the cereal would be wasted. The invention provides an improved form of feeler mechanism which detects the abnormal conditions of not only the complete absence of cartons on the incoming belt but also the fact that one carton does not immediately succeed another carton in tandum. It will be understood that the cross slide and end pushers, also the stop hook mechanism, are of a design to take care of at least two cartons as a unit, consequently if less than two cartons are presented to this mechnism considerable difficulty of operation, as well as inefficiency, might arise.

In addition to the intake feeler mechanism there is provided a feeler or detector on the outgoing belt for determining as to whether there is a jam of filled cartons at this point. This discharge feeler is so positioned that if normal conditions obtain i. e. if the cartons are proceeding orderly along the belt and are not piling up, the feeler will detect the space between the tandum cartons which is normally present. If a jam exists at this point, the cartons will contact with one another and the normal space between cartons will be absent. It is therefore apparent that whereas the intake feeler detects the abnormal condition of having no cartons at all, or the absence of a second carton succeeding the first carton, or vice versa, the discharge feeler detects the abnormal condition of having so many cartons on the outgoing belt that they actually contact one another. When either the incoming or the outgoing feeler detects an abnormal condition the machine, or rather the important parts thereof, are immediately disengaged from the motor and hence stopped.

The incoming feeler consists of an upright rod 292 (Figure 1) having a finger 293 projecting inwardly toward the space between the guide rails 39, and positioned at the upper end of the rod. The latter is secured to a shift 292a. For oscillating this shaft, there is provided a shaft 294 journalled at 294a, this shaft extending practically over the entire length of the machine and terminating at its far end in a lever 296 which carries a roller 297 (Figure 8). This roller is spring pressed against a cam 298 secured to the auxiliary cam shaft 5. The shaft 294 is connected to the shaft 292a through an arm 295, pivoted at 295a to a connecting rod 295b. The latter oscillates an arm 295c connected to the shaft 292a (Figure 9). Thus as the cam 298 is being continually rotated the shaft 294 is rocked, causing the feeler finger 293 to move across the space which is normally travelled by the empty cartons on their way to the filling position.

The arrangement is such that when the finger 293 feels a carton during the oscillatory movement of the finger, the roller 297 does not completely enter the depression of the cam.

Figure 16:
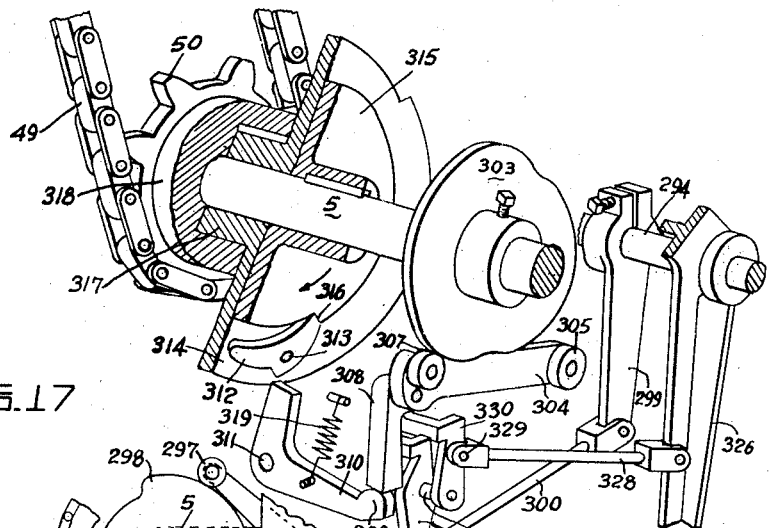
Figure 16 is a somewhat simplified perspective of a portion of the mechanism seen in Figure 17.

Secured to the shaft 294 is a downwardly extending lever 299, which carries at its lower end a pivotally mounted connecting rod 300 (Figure 16). This connecting rod is pivoted to the lower end of a vertically mounted dog 301 which is adapted to rotate on a shaft 302. Thus as the shaft 294 is rocked by the cam 298 the dog 301 is caused to oscillate on the shaft 302. Immediately above the dog 301 and secured to the cam shaft 5 is a cam 303. A lever 304 is pivoted at 305 and carries a roller 307 which is spring-pressed against the cam 303.

On the same end of the lever 304 there is pivotally mounted a downwardly extending arm 308, the inside surface of which is adapted to contact with the upper edge of the dog 301. The lower edge of the arm 308 rests on the nub 309 of a bellcrank lever 310, pivoted at 311. When the lever 310 is in its uppermost position the upper arm of the lever is adapted to strike the tail of a pawl 312, which is pivoted at 313. This pawl is carried on a circular plate 314 which is loosely mounted on the shaft 5. Abutting the side of the plate 314 there is a smaller plate 315 having a notch 316, which is adapted to be engaged by the tongue of the pawl 312 unless the tail of the latter strikes the upper arm of the lever 310. The plate 315 is keyed to the shaft 5. The plate 314 has a hub 317 to which is keyed the hub 318 secured to the sprocket 50. Rotative effort can be communicated from the shaft 5 to the sprocket 50 only when the pawl 312 is engaged in the notch 316. As the shaft 5 rotates the cam 303 causes the lever 304 to oscillate up and down on its pivot 305. Assuming that the arm 308 remains in its vertical position, this arm will oscillate the lever 310 and will periodically with draw the upper portion of the lever 310 out of the path of the pawl 312. This pawl is normally spring-pressed into the notch and consequently rotation of the shaft 5 will drive the sprocket 50 under these conditions.

Now assume that an abnormal condition arises in the incoming line in that the feeler rod 293 fails to detect a carton, due perhaps to a failure of supply of empty cartons on the incoming conveyor belt. The roller 297 is now caused to completely enter the depression of its cam and the shaft 294 will be given an abnormal rocking effect. This movement is communicated to the lower end of the dog 301 in the form of an abnormal swing about its shaft 302. The upper edge of the dog 301 will strike the arm 308, swinging this arm outwardly on its pivot so that the lower edge of this arm will no longer strike the nub 309 of the lever 310 during the vertical excursions of the arm. The lever 310 will therefore rotate on its axis 311, due to the biasing spring 319, causing the upper portion of the lever 310 to move in the path of the pawl 312. Thus as the plate 314 tends to rotate clockwise (Figure 16) the pawl 312 is moved out of the notch 316, bringing the plate 314 to rest. The stoppage of the plate prevents rotation of the sprocket 50 and hence rotation of the sprocket 48 on the cam shaft 6. The latter shaft comes to rest and all of the mechanical movements which depend on cams and gears secured to the shaft 6 are stopped.

Thus the cross-slide and end pusher mechanism, also the indexing motion of the hopper including its volume adjustment and the carton stop mechanism, no longer operate when the feeler rod 293 detects the absence of cartons on the incoming belt 35. The only mechanisms which will be actuated under these circumstances are the conveyor belts and the feelers, all of which may be operated without damage to the machine in case the feeler detects an abnormal condition. Figure 3 will show that this last-mentioned mechanism is secured to the auxiliary cam shaft 5, and motion is transmitted either through the bevel gear 22 or at the incoming feeler cam 298. It has been pointed out that there is also a feeler in the outgoing line to detect the absence of a space between the cartons travelling on the outgoing conveyor. The absence of a space between cartons would indicate that the cartons were piling up due to abnormal conditions in the outgoing conveyor line. During normal operation the cartons are spaced from one another and the feeler is so operated that when in filling position it detects the space between the cartons and the machine continues to run. But when the cartons are piled up against one another, leaving no space therebetween, the absence of the space will prevent movement of the feeler and will cause the machine to stop.

Figure 17:
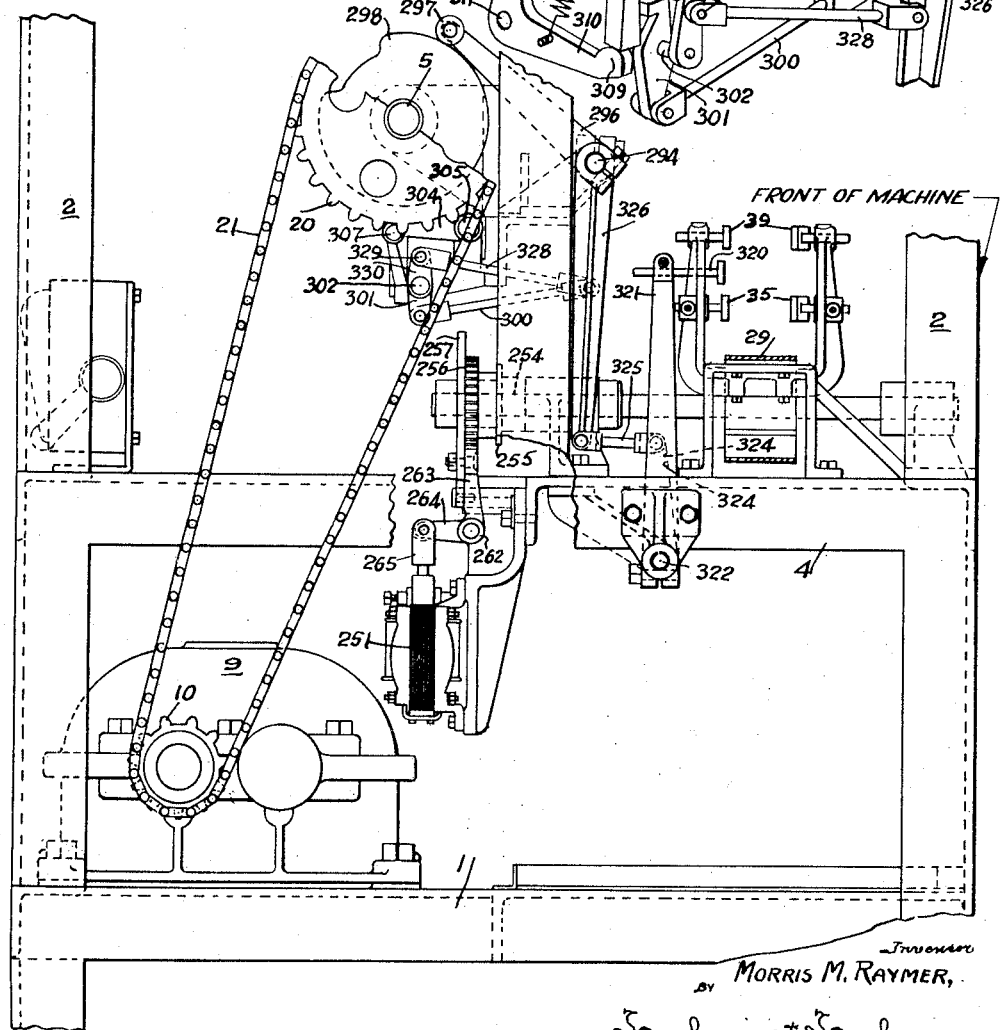
Figure 17 is a left-end elevation of the lower part of the machine, as indicated on the line 17—17 of Figure 1.

The outgoing feeler is designated by the reference numeral 320 (Figure 17) and is mounted on the end of a lever 321 secured to the shaft 322. The latter is journalled at 323 to the frame of the machine (Figure 1) in any suitable manner. A lever 324 is secured to the shaft 322, and there is a connecting rod 325 pivoted to the upper end of the lever (Figure 17). This connecting rod is pivotally secured to a long downwardly extending bellcrank lever 326 which is loosely mounted on the shaft 294, the upper arm of which carries a roller which is spring-urged against a cam 327 mounted on the cam shaft 5 (Figure 8). Secured to the lower arm of the lever 326, approximately midway between the shaft 294 and the pivoted end of the connecting rod 325 (Figures 16 and 17), there is pivoted a connecting rod 328, one end of which is pivotally secured as at 329 to a dog 330, pivoted on the shaft 302. The upper edge of the dog 330 normally contacts with the inside edge of the arm 308, but when the connecting rod 328 is moved any appreciable distance this upper edge is withdrawn away from the arm 308, permitting the arm to rotate about its pivot. The arm 308 is biased in any suitable manner, for example by means of a spring which tends to move the arm through a small angle counter-clockwise as seen in Figure 16.

Let us assume that the feeler 320 is moving to the right and to the left (Figure 17), due to rotation of the cam 327. Now supposing a jam or piled-up condition exists on the outgoing conveyor 29 (Figure 6) and thus the feeler 320 cannot detect a space between the cartons but instead actually strikes the cartons. Under these conditions the feeler will not be permitted to move through its normal length of travel and the roller is prevented from fully entering the depression in the cam 327. The bellcrank lever 326 will therefore not rotate through its normal angular movement. Due to the bias of the arm 308 the excusions of the rod 328, under these conditions, will cause the arm 308 to miss the nub 309 and the pawl 312 will be withdrawn from contact with the notch 316. Thus the pawl is disengaged from the notch 316, and the plate 314 which carries the sprocket 50 is brought to rest. Under these circumstances all of the mechanism which depends for its actuation on the rotation of the main cam shaft 6 is brought to a stop and only the conveyor belts and the feeler mechanism continue to operate. When either the incoming or the outgoing feeler detects that something is wrong in operation, the motor 7 of the machine is normally stopped at the push botton switch 15 and the cause of the stoppage remedied.

*Additional safety mechanism*

Figure 14:
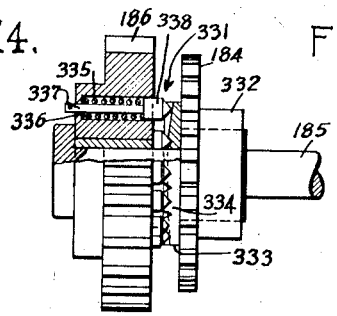
Figure 14 is a detail sectional view on the the line 14—14 of Figure 13.
Figure 15:
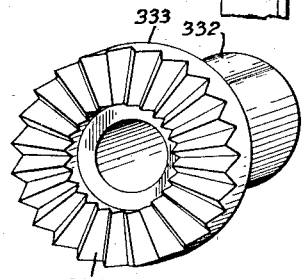
Figure 15 is a perspective of one of the clutch members shown in Figure 14.

Another safety device which may be found desirable on occasion is used in connection with the automatic control of the volume of the hopper brought about by the scale beam 91. It has been pointed out that when the scale detects an underweight carton the movable walls 160 are moved outwardly, due to the operation of the left-hand clutch 182 (Figure 3). On the other hand, when the scale detects on overweight carton the right-hand clutch 182 serves to move the hopper walls 160 inwardly to reduce the volume of the hopper. When one of these clutches is engaged the other is normally disengaged. However, it is conceivable that the clutch which should be disengaged might for some reason or other fail to disengage, in which case the sprockets 166 would be subjected to rotative effort in two directions. In order to prevent this remote possibility there is provided a safety clutch 331 (Figure 3), positioned between the left-hand clutch 182 and its sprocket 183. The details of the safety clutch are shown in Figures 14 and 15.

This safety clutch is positioned preferably between the gear 186 and its sprocket 184 on the shaft 185. The sprocket 184 is mounted on a hub 332 secured to the shaft 185, this hub having an enlarged portion 333 which carries radially extending teeth 334 on one face thereof. The gear 186, which is positioned adjacent the sprocket, is provided with a plurality of circular counterbores 335 which receive helical springs 336 and the shanks 337 of plungers 338. These plungers have conical ends which are urged by the springs 336 into the depressions formed by the teeth 334. The gear 186 is loosely mounted on the shaft 185 and obtains its rotative effort only through the plungers 338. The latter are pressed into the teeth 334 with sufficient force to cause the gear 186 to rotate with the sprocket 184, but this force is not great enough to prevent slippage between the gear 186 and its sprocket 184 when the gear is caused to turn in the opposite direction, due to the rotation of the gear 187.

Thus if the clutches 182 are both engaged, as when one clutch fails to become disengaged, the right-hand clutch 182 (Figure 3) will rotate the sprocket 175, causing the hopper sprockets 166 to rotate and thus reduce the volume of the hopper compartments. The gear 187, which is connected with the sprocket 175, will also be rotated. However, the left-hand clutch 182 (Figure 3) will rotate the sprocket on the shaft, but this rotation causes only a slippage at the teeth 334 because the gear 186 tends to move in the opposite direction through its meshing effect with the companion gear 187. In other words, the over-weight clutch and gear mechanism is given preference to the under-weight clutch and gear mechanism when the two clutches accidentally become locked, and no damage whatever is done to the machine. It will be understood that the safety clutch 331 is purely optional and under normal conditions would not be called upon to operate.

Cycle of operation (cam design)

Figure 34 shows in graph form the relation between the periodic movements of the various mechanisms. This figure employs an ordinate designating the travel of the various cams and an abscissa designating angles of rotation, marked off in degrees. While the graphs appear to be self-explanatory for the most part, a few illustrative examples will be pointed out. The line *a*, in a general way, indicates that at approximately 20 degrees angular rotation (assuming a complete cycle represents 360 degrees), the crossslide cam 46 starts to push a pair of cartons from the belt 35 onto the platform 36, until at approximately 270 degrees the cartons rest on the platform 36. Shortly thereafter (about 300 degrees) the end pusher cam 66 starts to move the carton pair onto the scale pan, and this movement is completed at about 240 degrees along the following cycle, a deviation from the normal straight line indicating a continuation of the operation. It is apparent that the end pusher mechanism, as seen from the graph, operates for a much longer period of time than the crossslide mechanism. This is indicated by the line *b*.

Line *c* indicates that the cam for the stop hook 65 operates through approximately 230 degrees of the complete cycle of the machine. However, a carton is not stopped by the hook until the carton has reached the hook. The sack or lineropening fingers 271 and the sack-spreading fingers 285 operate for approximately 180 degrees, as indicated by the respective lines *d* and *e*. The carton-filling cycle, i. e. the operations of pushing the carton from the incoming conveyor to the spout, opening the carton or sack, then filling and weighing the carton and finally delivering the carton to the outgoing conveyor, operates continuously, as is graphically shown by the line *f*. The gripper mechanism 112 is released through a period of about 100 degrees, as indicated by the line *g*, this period of operation starting about the same time that the operation of filling a pair of cartons is concluded. The unlatching of the mechanism (bellcrank lever 210, etc., Figure 22), by which the volume of the hopper is changed in response to the indications of the scale beam, takes place through approximately 180 degrees, as indicated by the line *h* (Figure 34). The lines *i*, *j*, *k* and *l* give corresponding information with respect to the periods of time during which either one of the clutches 200 is engaged to adjust the hopper volume; also the movements of the intake and discharge feeler mechanisms, and finally the period of time over which the machine-stop cam operates in case an abnormal carton condition is found to exist on either the incoming or the outgoing line.

A machine of the character described hereinbefore has been found to operate satisfactorily in filling successive pairs of cartons with fluent material, such as is indicated in Figure 33, and a check of precise character is provided by the scale and cooperative photo-electric system to assure that the weight of the cartons conforms very accurately to a predetermined standard. This adjustment of weight takes place continuously when needed, a small adjustment at a time, until the proper weight of carton has been established. It has been found that by the use of the additional spreading fingers 285 it is no longer necessary to elevate the cartons up to the spouts in order to prevent leakage of material around the sides of the carton. Thus, a large amount of mechanism pertaining to the elevating operation can be discarded. The improved stop hook mechanism which employs only one stop hook, and without necessitating extreme accuracy of actuation, constitutes another important feature of this invention. The modified form of Geneva movement for operating the paddle wheel in the hopper gives long life to the machine by eliminating the shocks of sudden starting and stopping of the wheel.

It will be understood that I desire to comprehend within my invention such modifications as come within the scope of the claims and the invention.

Having thus fully described my invention, what I claim as new and desire to secure by Letters Patent, is:

1. In a container-filling machine, in combination, a source of power, load forming mechanism for filling containers, a scale having a beam counterweighed to a standard load, means for presenting the containers in succession onto the scale to receive a load and to be weighed, load varying mechanism controlled by the scale to increase or decrease the amount of each succeeding load delivered by the load forming mechanism in the event that the scale indicates a variation in the tested load from the standard, power driven means actuated by said source of power for driving said load varying mechanism, said load varying mechanism including a clutch interposed within said power driven means, a clutch lever for actuating said clutch and an electromagnet energized when the scale indicates a variation from the standard load, a latch interposed between said clutch lever and said electromagnet for preventing movement of said clutch lever, said electromagnet, when energized, actuating said latch to unlatch said clutch lever, and means actuated by said source of power operating independently of the energization of said electromagnet for preventing actuation of said clutch except during a predetermined portion of the cycle of operation of the container-filling machine which portion is between filling operations of said load forming mechanism.

2. In a container-filling machine, in combination, a source of power, load forming mechanism for filling containers, a scale having a beam counterweighed to a standard load, means for presenting containers in succession onto the scale to be filled and weighed, load varying mechanism including a phototube controlled by the scale to alter the amount of each succeeding load delivered by the load forming mechanism in the event that the scale indicates a variation in the tested load from the standard, power driven means actuated by said source of power for driving said load varying mechanism, said phototube being contained in a circuit which includes an electromagnet, and means for synchronizing the actuation of said load varying mechanism so as to be operable only during a predetermined portion of the cycle of operation of the container-filling machine, said portion of the cycle of operation being between filling operations of said load forming mechanism, said synchronizing means including a clutch interposed within said power driven means, a latching device operable by said electromagnet, said latching device being operable to lock and unlock the actuation of said clutch, and a cam controlled member operating independently of the energization of said electromagnet for preventing actuation of said latching device by said electromagnet until after said load forming mechanism has completed the filling of the container.

3. In a container-filling machine, in combination, a source of power, a load forming mechanism for filling containers, a scale having a beam counterweighed to a standard load, means for presenting containers in succession onto the scale to be filled and weighed, load varying mechanism including a phototube controlled by the scale to alter the amount of each succeeding load delivered by the load forming mechanism in the event that the scale indicates a variation in the tested load from the standard, power driven means actuated by said source of power for actuating said load varying mechanism, said phototube being contained in a circuit which includes an electromagnet, and means for synchronizing the actuation of said load varying mechanism so as to be operable only during a predetermined portion of the cycle of operation of the container-filling machine, said portion of the cycle of operation being between filling operations of said load forming mechanism, said synchronizing means including a clutch, a clutch lever, means for actuating said clutch lever, a latching device for preventing actuation of said clutch lever operable by said electromagnet, a cam controlled member operating independently of the energization of said electromagnet for preventing actuation of said latching device until after said load forming mechanism has completed the filling of a container, and a second cam causing termination of the actuation of said mechanism operating independently of the energization of said electromagnet before said load forming mechanism starts a succeeding filling operation.

4. In a container-filling machine, in combination, a source of power, a load forming mechanism for filling containers, a scale having a beam counterweighed to a standard load, means for presenting containers in succession onto the scale to receive a load and to be weighed, load varying mechanism including a phototube controlled by the scale to alter the amount of each succeeding load delivered by the load forming mechanism in the event the scale indicates a variation in the tested load from the standard, said phototube being contained in a circuit which includes an electromagnet, power driven means actuated by said source of power for driving said load varying mechanism, a clutch interposed within said power driven means, a lever for actuating said clutch, means for moving said lever, a bellcrank interposed between said clutch lever and said electromagnet for preventing movement of said clutch lever, said electromagnet actuating said bellcrank when energized by said phototube, a cam controlled member operating independently of the energization of said electromagnet to restrain movement of the bellcrank lever except during a predetermined portion of the cycle of operation of the container-filling machine which portion of the cycle is between filling operations of said load forming mechanism.

5. In a container-filling machine, in combination, a source of power, a load forming mechanism for filling containers, a scale having a beam counterweighed to a standard load, means for presenting containers in succession onto the scale to receive a load and to be weighed, load varying mechanism including a phototube controlled by the scale to alter the amount of each succeeding load delivered by the load forming mechanism in the event the scale indicates a variation in the tested load from the standard, said phototube being contained in a circuit which includes an electromaget, power driven means actuated by said source of power for driving said load varying mechanism, a clutch interposed within said power driven means, a lever for actuating said clutch, means for moving said lever, a bellcrank interposed between said clutch lever and said electromagnet for preventing movement of said clutch lever, said electromagnet actuating said bellcrank when energized by said phototube, a cam controlled member operating independently of the energization of said electromagnet to restrain movement of the bellcrank lever except during a predetermined portion of the cycle of operation of the container-filling machine which portion of the cycle is between filling operations of said load forming mechanism, and a cam for actuating said clutch lever to de-clutch said mechanism before said load forming mechanism starts a succeeding filling operation.

6. A container-filling machine having in combination, a source of power, load forming mechanism for filling containers including a measuring drum provided with a movable wall, load testing mechanism including a scale and mechanism for varying the volume of each of the succeeding loads produced by the load forming mechanism, means for presenting said containers onto said scale to be filled by said load forming mechanism and to be tested by said load testing mechanism, said load testing mechanism including a phototube and a lamp adapted to close an electrical circuit when the scale is moved out of balance under the influence of a load varying from a standard, an electromagnet in said circuit, power driven means and a clutch under control of said magnet between said source of power and the movable wall of said measuring drum to effect movement of the drum to vary the volume thereof, means for actuating said clutch including a clutch lever, means for preventing actuation of said clutch to prevent movement of said wall of said drum except between filling operations of said load forming mechanism including a restraining lever interposed between said clutch lever and said electromagnet for preventing movement of said clutch except when said electromagnet releases said restraining lever and a cam controlled member operated to prevent movement of said restraining lever irrespective of the energization of said electromagnet except between filling operations of said load forming mechanism, and means including a pair of limit switches for preventing excessive movement of the wall of the drum in either direction under the influence of the underweight and overweight load, said limit switches being of the mercury type and the envelope of each switch being rotated to break said electrical circuit when the movement of the wall of the measuring drum is excessive.

7. A container-filling machine having in combination, a source of power, load forming mechanism for filling containers including a measuring drum provided with a movable wall, load testing mechanism including a scale and mechanism for varying the volume of each of the succeeding loads produced by the load forming mechanism, means for presenting containers onto said scale to be filled by said load forming mechanism and to be tested by said load testing mechanism, said load testing mechanism including a phototube and a lamp adapted to close an electrical circuit when the scale is moved out of balance under the influence of a load varying from the standard, an electromagnet in said circuit, power driven means and a clutch under control of said magnet between the source of power and said movable wall of said measuring drum to effect movement of the drum to vary the volume thereof, a lever for actuating said clutch, means for preventing actuation of said clutch to prevent movement of said movable wall of said measuring drum except between filling operations of said load forming mechanism including a restraining lever interposed between said clutch lever and said electromagnet for preventing movement of said clutch except when said electromagnet releases said restraining lever and a cam controlled member operated to prevent movement of said restraining lever irrespective of the energization of said electromagnet except between filling operations of said load forming mechanism, and means including a pair of limit switches for preventing the excessive movement of the wall of the drum in either direction under the influence of the underweight and overweight load, said limit switches being of the mercury type and the envelope of each switch being rotated to break said electrical circuit when the movement of the wall of the measuring drum is excessive, said switches being positioned substantially in line with the drum, and means extending from a rod connected with said movable wall of the drum for rotating any one of the switches depending on the direction in which the wall of the drum is moved.

8. In a container-filling machine, in combination, a source of power, load forming mechanism for filling containers, a scale positioned beneath said mechanism and having a beam counterweighted to a standard load, means for presenting containers in succession onto the scale to receive a load and to be weighed and load varying mechanism controlled by the scale to increase or decrease the amount of each succeeding load delivered by the load forming mechanism in the event that the scale indicates a variation in the tested load from the standard, power driven means for actuating said load varying mechanism, said load varying mechanism comprising a pair of phototubes and lamps arranged in substantial alignment cooperating respectively therewith, a shield between each pair of phototubes and lamps, said shield being secured to said beam and having a pair of openings arranged, respectively, at different heights in said shield and adapted to transmit light from each of the lamps respectively to the phototubes, one of said openings being presented to a lamp when the scale beam is deflected to indicate that the load is greater than or less than the standard load, and means for synchronizing the actuation of said load varying mechanism so as to be operable only during a predetermined portion of the cycle of operation of the container-filling machine including a pair of clutches located in said power driven means for actuating said load varying mechanism, a pair of clutch actuating levers, means for actuating said clutch levers, a pair of restraining members for preventing actuation of said clutch levers, a pair of electromagnets energized by said phototubes for releasing said restraining members, and a pair aof cam controlled members operated to prevent movement of said restraining levers irrespective of the energization of said electromagnets except between filling operations of said load forming mechanism.

9. In a container-filling machine, in combination, a source of power, load forming mechanism for filling containers, a scale positioned beneath said mechanism and having a beam counterweighted to a standard load, means for presenting containers in succession onto the scale to receive a load and to be weighed, and load varying mechanism controlled by the scale to increase or decrease the amount of each succeeding load delivered by the load forming mechanism in the event that the scale indicates a variation in the tested load from the standard, power driven means for operating said load varying mechanism, said load varying mechanism comprising a pair of phototubes and lamps cooperating therewith, a shield between each pair of phototubes and lamps, said shield being secured to said beam and having a pair of openings, each of said openings being out of line and on opposite sides of the axis of light passing between the respective lamps and their phototubes, whereby as the scale is moved upwardly one of the openings permits light to pass between one of the lamps and its phototube and when the scale beam moves downwardly the other opening will permit light to pass between the other lamp and its phototube, means responsive to the activation of one of said phototubes for increasing the size of the load and means responsive to the activation of the other phototube for decreasing the size of the load, and means for synchronizing the activation of said means for increasing the load size and said means for decreasing the load size so as to be operable only during a predetermined portion of the cycle of operation of the container-filling machine including a pair of clutches interposed within said power driven means, a clutch lever for actuating each of said clutches and a pair of electromagnets energized by said phototubes, latches interposed between said clutch levers and said electromagnets for preventing movement of said clutch levers, said electromagnets actuating said latches when energized by said phototubes to unlatch said clutch levers, and means including a pair of cam controlled members separately actuated by said source of power operating independently of the energization of said electromagnets for preventing actuation of said latches except between filling operations of said load forming mechanism.

10. In a container-filling machine, in combination, a source of power, load forming mechanism for filling containers, a scale positioned beneath said mechanism and having a beam counterweighted to a standard load, means for presenting containers in succession onto the scale to receive a load and to be weighed, and load varying mechanism controlled by the scale to increase or decrease the amount of each succeeding load delivered by the load forming mechanism in the event the scale indicates a variation in the tested load from the standard, power driven means for actuating said load varying mechanism, said load varying mechanism comprising a pair of phototubes and lamps cooperating respectively therewith, said phototubes and lamps being disposed horizontally with respect to each other, a shield between each pair of phototubes and lamps, said shield being secured to said beam and having a pair of openings, one of said openings being positioned in the vertical plane of the light transmitted from one of the lamps to its phototube but being positioned above the line of light, the other of said openings being positioned in the vertical plane of the light passing between the other lamp and its phototube but being positioned below the line of light, whereby as the scale beam is moved to a position on either side of the balance position one of the phototubes will be energized, means responsive to the energized phototube for changing the size of the load and in a direction depending on which of the two phototubes has been energized including a pair of clutches interposed within said power driven means, a clutch lever for actuating each of said clutches, a pair of electromagnets energized by said phototubes, latches interposed between each of said clutch levers and electromagnets for preventing movement of said clutch member, said electromagnets actuating said latches when energized by said phototubes to unlatch said clutch levers, and means actuated by said source of power operating independently of the energization of said electromagnets for preventing actuation of said latches except between filling operations of said load forming mechanism.

MORRIS M. RAYMER.